(12) United States Patent
Shiell et al.

(10) Patent No.: US 8,977,648 B2
(45) Date of Patent: Mar. 10, 2015

(54) FAST AND ROBUST CLASSIFICATION ALGORITHM FOR VEIN RECOGNITION USING INFRARED IMAGES

(75) Inventors: Derek Shiell, Los Angeles, CA (US); Jing Xiao, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 121 days.

(21) Appl. No.: 13/443,615

(22) Filed: Apr. 10, 2012

(65) Prior Publication Data

US 2013/0268563 A1    Oct. 10, 2013

(51) Int. Cl.
- *G06F 17/30* (2006.01)
- *G06K 9/00* (2006.01)
- *G06N 99/00* (2010.01)

(52) U.S. Cl.
CPC  *G06F 17/30* (2013.01); *G06K 9/00* (2013.01); *G06N 99/005* (2013.01)
USPC ............ 707/797; 707/736; 707/737; 707/741

(58) Field of Classification Search
CPC ................................................ G06F 17/30271
USPC ......................................................... 707/797
See application file for complete search history.

(56) References Cited

U.S. PATENT DOCUMENTS

| | | | |
|---|---|---|---|
| 6,569,104 B2 | 5/2003 | Ono et al. | |
| 7,343,032 B2 | 3/2008 | Oakley et al. | |
| 7,646,903 B2 | 1/2010 | Kaftan et al. | |
| 7,680,748 B2 * | 3/2010 | Heisele et al. | 706/13 |
| 2004/0039914 A1 * | 2/2004 | Barr et al. | 713/176 |
| 2006/0008124 A1 | 1/2006 | Ewe et al. | |
| 2009/0074259 A1 * | 3/2009 | Baltatu et al. | 382/118 |
| 2009/0324026 A1 * | 12/2009 | Kletter | 382/124 |
| 2010/0045788 A1 | 2/2010 | Zhang et al. | |
| 2010/0104158 A1 * | 4/2010 | Shechtman et al. | 382/131 |
| 2010/0198078 A1 | 8/2010 | Abe | |
| 2010/0202670 A1 * | 8/2010 | Tian et al. | 382/118 |
| 2011/0182483 A1 * | 7/2011 | Du et al. | 382/117 |
| 2012/0002868 A1 * | 1/2012 | Loui et al. | 382/159 |

OTHER PUBLICATIONS

Mach, Lukas. File:Sift keypoints filtering.jpg. Feb. 13, 2008 [retrieved on Aug. 26, 2013]. Retrieved from the Internet: <URL:http://en.wikipedia.org/wiki/File:Sift_keypoints_filtering.jpg>.*

* cited by examiner

*Primary Examiner* — Kannan Shanmugasundaram
*Assistant Examiner* — Kris Andersen

(57) ABSTRACT

A specific item within an item class is identified by defining sets of descriptor data from a training library. The collected descriptor data is grouped and organized into a hierarchical tree, where each leaf node is defined by relations between corresponding parts of the descriptor data. Registrable sets of descriptor data are then identified from a collection of registrable samples. The registrable sets of descriptors are sorted into the hierarchical tree. When an input sample to be identified is received, a test set of descriptor data is generated from the input sample. The test set is then sorted into the hierarchical tree. Each leaf node that receives a part of the test set provides a vote for the registered samples it contains. The registered sample with the most votes is deemed a match for the input sample.

11 Claims, 19 Drawing Sheets

FAST AND ROBUST CLASSIFICATION ALGORITHM FOR VEIN RECOGNITION USING INFRARED IMAGES

BACKGROUND

1. Field of Invention

The present invention generally relates to biometric identification using blood vessel images. More specifically, the present invention relates to the use of hierarchical feature indexing for quick vein recognition

2. Description of Related Art

Biometrics refers to the use of intrinsic human traits for personal identification purposes. That is, a person may be identified by one or a combination of multiple different personal trait characteristics of that person. Examples of such personal traits are a fingerprint, a hand print (length and thickness of the fingers, size of the hand itself), a retina scan (pattern of blood vessels in the eye), an iris scan, a facial photograph, a blood vessel pattern (vein pattern), a voice print, a dynamic signature (the shape and time pattern for writing a signature), or a keystroke pattern (key entry timing).

Of particular interest are biometric identification techniques that use blood vessels, or veins, for personal identification. A method for automatically identifying blood vessels in a diagnostic image is described in U.S. Pat. No. 7,343,032, and an example of a technique for obtaining diagnostic images of blood vessels from a human eye for personal identification (ID) purposes is shown in U.S. Pat. No. 6,569,104. Another example provided in U.S. Pub. No. 2010/0045788 describes the use of visible and near infrared light to acquire diagnostic images of a palm print image for personal identification. A technique for using vein authentication on a finger for identification purposes is described in U.S. Pub. No. 2010/0198078.

Various techniques are known for identifying specific pattern structures in diagnostic images. One technique for identifying blood vessel patterns is by means of path-based tree matching, such as described in U.S. Pat. No. 7,646,903. Tree matching algorithms require tree structures as input. This structure describes the tree as a series of branches interconnected through branch points. Several known algorithms can be used to obtain the tree structure including tracking, segmentation, and skeletonization. Once the tree structure is obtained, a matching algorithm operates directly on the structure and any data contained therein.

There are various matching algorithms known in the art, but they tend to be slow and computationally intensive. What is needed is an efficient method of applying tree matching to biometric applications.

Another object of the present invention is to provide a hierarchical approach that not only identifies the closest matching vein pattern to a query, but also has the ability to reliability and efficiently reject a false positive identification.

SUMMARY OF INVENTION

The above objects are met in a method of identifying a specific item within an item class, the method including: (a) from a training library of item samples of the item class, identifying a separate set of item descriptors for individual item samples in the training library; (b) collecting the separate sets of item descriptors into a composite collection of item descriptors; (c) organizing the composite collection of item descriptors into a hierarchical tree structure according to relations in the item descriptors; (d) accessing a collection of unique registrable item samples belonging to the item class, each registrable item sample being a representation of a different target item and having a unique identification (ID) code identifying its corresponding target item; (e) identifying a, separate and corresponding, registrable set of item descriptors for each of the registrable item samples; (f) distributing the registrable sets of item descriptors into the hierarchical tree according to the relations in the item descriptors by which the hierarchical tree is organized, each leaf node of the hierarchical tree that receives any part of a registrable set of item descriptors also receiving the ID code of the registrable item corresponding to the registrable set of item descriptors to which the received part belongs; (g) accessing the specific item, identifying a specific set of item descriptors for the specific item, distributing the specific set of item descriptors into the hierarchical tree according to the relations in the item descriptors by which the hierarchical tree is organized, noting the ID codes of the leaf nodes that receive any part of the specific set of item descriptors, identifying the ID code that is noted most often as a target ID code; (h) identifying as the specific item, the target item corresponding to the target ID code.

Preferably, the present method further verifies the validity of the identified specific item. This may be done in several ways. One way is to augment step (g) by (i) identifying as a reference ID code, the ID code that is noted the second most often; (ii) IF the number of times that the ID code corresponding to the target ID code is noted, is greater by a predefined threshold, than the number of times that the ID code corresponding to the reference ID code is noted, THEN proceeding to step (g), ELSE concluding that none of the collection of unique registrable item samples is representative of the specific item and omitting step (g).

Alternatively, step (g) may further include: (i) identifying as top choices a predefined number of most often noted different ID codes, including the target ID code; (ii) cross-correlating the registrable item samples corresponding to the top choices to the specific item to determine if any match the specific item; (iii) IF a match is found in step (ii), THEN reassigning as the target ID code to the ID code of registrable item that matches the specific item, and proceeding to step (g), ELSE concluding that none of the collection of unique registrable item samples is representative of the specific item and omitting step (g). Additionally, step (ii) may include down-sampling the registrable item samples corresponding to the top choices, and removing any components not bigger than a predefined minimum size; down-sampling the specific item, and removing any components not bigger than a predefined minimum size; and comparing the resultant registrable item samples to the resultant specific item using a binary match method.

Another method of verifying the validity of the identified specific item is to augment step (g) to include (i) using a support vector machine to determine if the registrable item sample corresponding to the target ID code matches the specific item; (ii) IF a match is found in step (ii), THEN proceeding to step (g), ELSE concluding that none of the collection of unique registrable item samples is representative of the specific item and omitting step (g).

In yet another approach at verification, step (g) may further includes: (i) directly comparing the registrable item sample corresponding to the target ID code to the specific item to determine if they match each other; (ii) IF a match is found in step (ii), THEN proceeding to step (g), ELSE concluding that none of the collection of unique registrable item samples is representative of the specific item and omitting step (g). Preferably, in step (i), the comparing of the registrable item sample corresponding to the target ID code to the specific item to determine includes using at least one of KL-divergence or Bayesian model to compare the distribution of select parts of the registrable set of item descriptors of the registrable item sample identified by the target ID code to the distribution of the same select parts of the specific set of item descriptors of the specific item.

In the above-described method(s), the item class may be a biometric item class. In this case, the biometric item class may be a voice print. Alternatively, the biometric item class may be an image of a specific body part, such as a fingerprint, a human face, or a part of an eye.

Further alternatively, the item class may be a mapping of data. This data may be a political map, a climate map, a physical map, a road map, an economic resource map, a topographic map, or a vein distribution map.

Preferably, in the above-describe method(s), in step (c), the relations in the item descriptors are based on a recursive k-means organization.

A more specific application of the present invention is a biometric identification method identifying a registered individual by an input biometric image. This may preferably includes: (a) from a training library of biometric training images of a predefined biometric type, identifying a separate and corresponding set of image descriptors for the biometric training images; (b) collecting the separate sets of image descriptors into a composite collection of item descriptors; (c) organizing the composite collection of item descriptors into a hierarchical tree structure according to relations in the item descriptors; (d) accessing a collection of unique registrable biometric images, of the biometric type, and taken from individuals to be registered for later identification, each registrable biometric image having an identification (ID) code identifying its corresponding individual; (e) identifying a, separate and corresponding, registrable set of image descriptors for the registrable biometric images; (f) distributing the registrable sets of item descriptors into the hierarchical tree according to the relations in the item descriptors by which the hierarchical tree is organized, each leaf node of the hierarchical tree that receives any part of a registrable set of item descriptors also receiving the ID code of the individual corresponding to the registrable set of item descriptors to which the received part belongs; (g) accessing the input biometric image, identifying a test set of item descriptors for the input biometric image, distributing the test set of item descriptors into the hierarchical tree according to the relations in the item descriptors by which the hierarchical tree is organized, noting the ID codes of the leaf nodes that receive any part of the test set of item descriptors, identifying the ID code that is noted most often as a target ID code; and (h) identifying as the registered individual, the individual corresponding to the target ID code.

Preferably, in this method, in step (a), the predefined biometric type is a blood vessel pattern from a predefined part of a human body, and the biometric training images are blood vessel training images.

Also preferably in step (a), the biometric training images are subjected to a scale-invariant feature transform (SIFT) to produce SIFT feature descriptors, the SIFT feature descriptors being the set of image descriptors. In this case, (i) all of the SIFT feature descriptors have the same types and number of item descriptors; (ii) in step (b), the composite collection of item descriptors is formed by collecting all the SIFT feature descriptors into a common mapping space; (iii) in step (c), the composite collection of item descriptors are divided within the common space into sub-groups defined by a recursive k-means application, wherein: the recursive k-means application defines a root item descriptor within the common mapping space, and defines map paths within the common mapping space that extend from the root item descriptor to end sub-groups located at the ends of the common mapping space, and traverse inner sub-groups in between; the hierarchical tree structure is defined by the map paths from the root item descriptor to the end sub-groups, wherein the root item descriptor defines the root node of the hierarchical tree structure, the traversed inner sub-groups define inner nodes of the hierarchical tree, and the end sub-groups define leaf nodes of the hierarchical tree structure; and the sub-groups define the relations in the item descriptors.

Additionally in this specific application, the method may include after step (h): (i) comparing the input biometric image to the registrable biometric image taken from the individual identified as the registered individual to determine if they match; (ii) outputting a signal indicating that the registered individual matches the input biometric input image in response to a match being confirmed in step (i); (iii) outputting a signal indicating that no registered individual was found in response to a match not being confirmed in step (i).

Alternatively, step (g) may further include: (i) identifying as a reference ID code, the ID code that is noted the second most often; (ii) IF the number of times that the ID code corresponding to the target ID code is noted, is greater by a predefined threshold, than the number of times that the ID code corresponding to the reference ID code is noted, THEN proceeding to step (g), ELSE concluding that none of the collection of unique registrable biometric images is representative of the specific item and omitting step (g).

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

Figure 1:
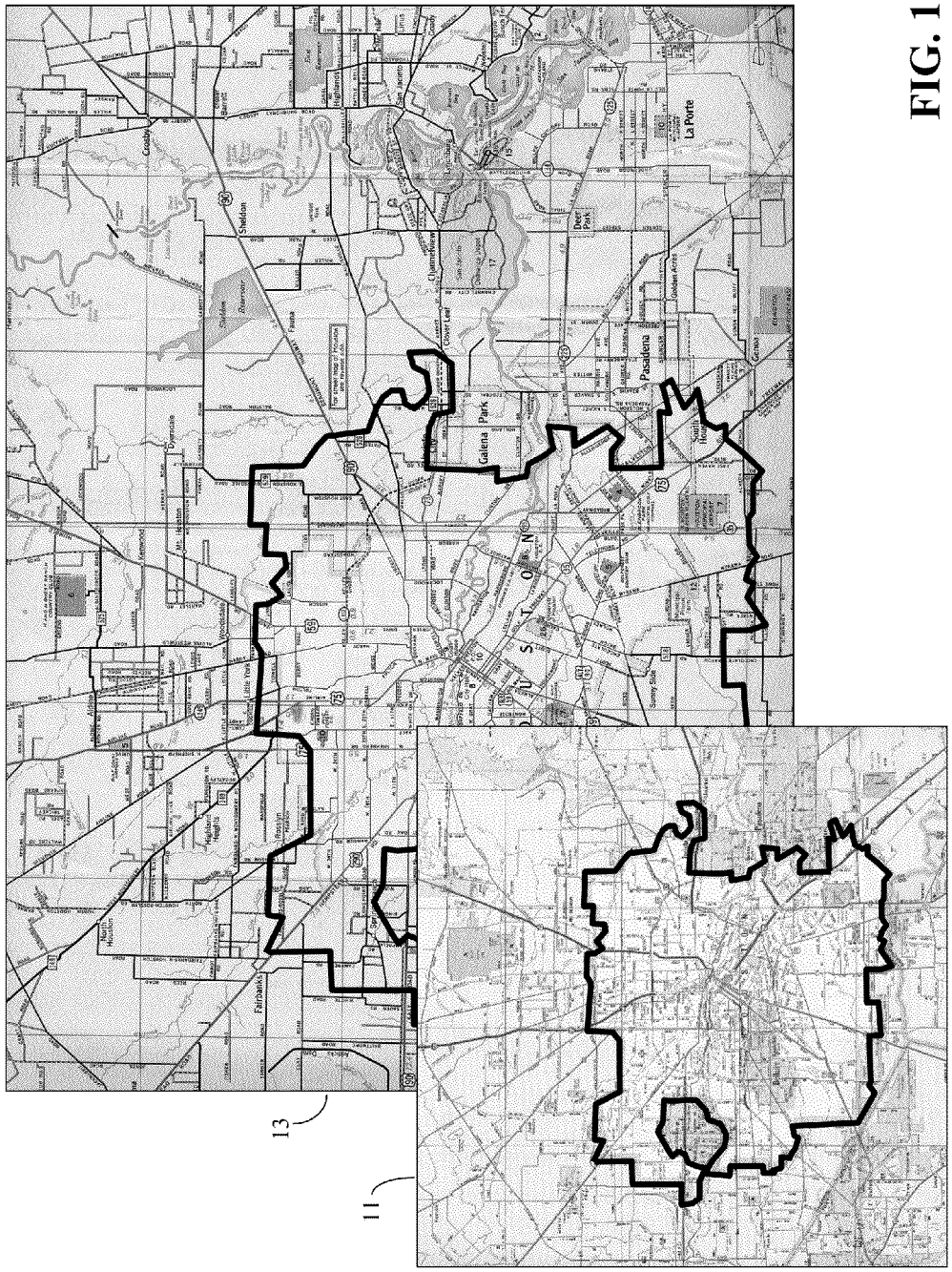
FIG. 1 shows street maps as an example of an item class.

People have many distinctive and personal characteristics that distinguish one person from another. Some examples of these distinguishing characteristics are fingerprints, facial features, vein (or blood vessel) patterns in various parts of the body, voice point, etc. The use of one (or a combination of) such distinguishing characteristics, or traits, to identify (or to verify the identity of) someone is termed Biometrics.

Biometrics thus involves receiving a test sample of a biometric feature, such as a finger print, and comparing the test sample with a registry of known (i.e. pre-registered) samples in an effort to find a match. Typically, the registry is built by registering known individuals. Each registering individual submits a true sample of a specific biometric feature, which then becomes his registered sample and is identified with that individual. In this manner, the registered sample is known to correspond to a specific (i.e. registered) individual, and a person's identity can be confirmed by matching the person's newly submitted test sample to his/her registered sample.

In the typical biometric identification process, a submitted test sample of someone wishing to be identified as registered person is compared with a registry of registered samples. If a match is found, then the test sample is identified as corresponding to the registered person associated with matched registered sample. If the person is not already registered within the registry of biometric samples, then the process should reject the person as unknown and not verified. Thus, the biometric identification process should only identify (i.e. recognize) registered persons. Much research has been made into various methods of precisely matching a submitted test sample to a library of registered sample, and avoiding false positives (i.e. confirming a match in error).

Problems may arise when a test sample submitted for recognition is truly from a registered person, but the test sample is not identical to the registered person's registered sample due to various circumstances. For example, the testing device that acquires the test sample may not be as precise as (or may otherwise be different or provide a different/partial view as compared to) the device used to originally register the person. Variations may also be due to physiological changes in the registered person that cause his/her test sample to vary to some degree from the registered sample (i.e., the true sample previously used to register the person). In this case, the biometric algorithm should be flexible enough to allow for such variations, but still be sophisticated enough to avoid mistakenly verifying a person that is not in the registry.

Such sophisticated systems can be slow to process submitted test samples, which is a problem since biometric identification devices are often used to control access to specific buildings, rooms, devices, and/or information, and an unduly long delay in verification can significantly disrupt workflow. Biometric systems can be sped up by creating special searching algorithms based on the library of registered samples, themselves. Because these special searching algorithms have search parameters specifically tailored to the registered samples, they can be made to execute faster than a general search mechanism. However, because these special search algorithms are tailor-made to the library of registered samples, they need to be reconstructed whenever the library of registered samples is changed. That is, if a new person is added to the registry (or a previously registered person is removed from the registry), a new tailor-made search algorithm needs to be constructed to reflect the current state of the registry, and the this new search algorithm then needs to be distributed to all biometric identification devices. Attempting to avoid reconstructing a special search algorithm by simply modifying an existing special search algorithm to accommodate a change in the registry typically renders less than satisfactory results, and increases the probability of false positive and false negative authentications.

The present invention simplifies the biometrics process by creating a search engine based on the general category of the item being searched. For example, if the biometric feature being used for authentication is a finger vein pattern, then the present searching mechanism would be trained on real-world examples of finger vein patterns, but these real-world examples would not come from the registered persons. Preferably, a specified number of distinguishing features are identified and categorized (or grouped) for each of the real-world examples, and these categories are then organized into an easy to search format. When a person is registered, the specific number of distinguishing features are identified in the submitted true biometric feature sample (i.e. a finger vein pattern in the present example), and these distinguishing features would then be sorted by similarity into the previously constructed categories. Adding and removing a person to the registry is a simple matter of adding or removing that person's corresponding distinguishing features (identified by registered sample ID) from the defined categories (or groups). Reconstruction of the search engine is not required.

Verification of a registered person is a similar process of receiving a person's test sample, identifying the specific number of distinguishing features in the test sample, and identifying which categories these distinguishing features would sort into by similarity. Each identified category would list the ID's of the registered persons who are represented in that category (i.e. whose registered samples have some distinguishing feature sorted into that category). By noting the ID that is found most often in the categories into which the test sample sorted, one can identify the matching registered sample.

An added benefit of the present method is that it may be applied to various types of search applications. That is, it may be used to identify specific items of a given item class. For example if the item class is street maps, as shown in FIG. 1, it can be used to quickly find a match between a portion of a small street map 11 (i.e. the specific item), with a corresponding portion in a larger street map 13. The present invention, which is more fully explained below, may be extended to any mapping of data of images of a given item class. For example, it may be applied to political maps, climate maps, or economic resource maps to identify a period in the past that most closely matches a current situation. The invention could also be applied to physical maps, road maps, and topographic maps.

For illustration purposes, the present invention is described as applied to a vein distribution map, but it is to be understood that it may be equally applied to other types of biometric identification features, such as for example, fingerprints, hand prints, a retina scans, iris scans, a facial photographs, blood vessel patterns, voice prints, dynamic signatures, keystroke patterns, etc.

Figure 2:
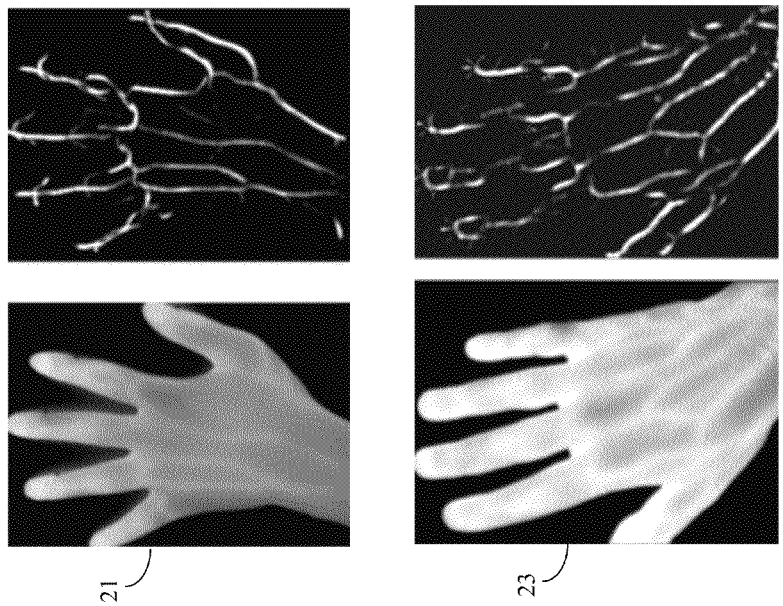
FIG. 2 shows various types of vein maps as examples of item classes.
Figure 2:
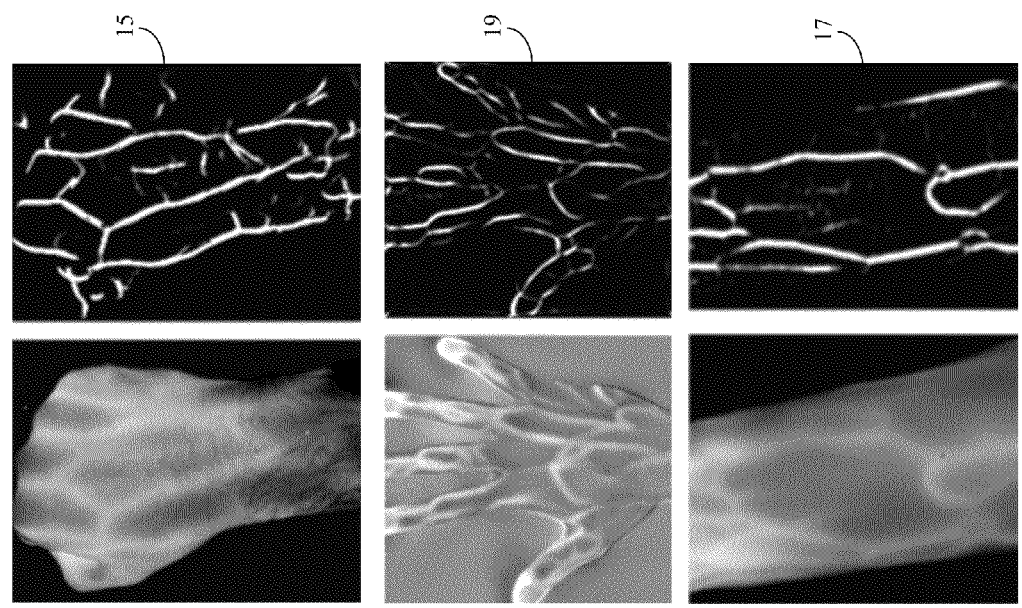

FIG. 2 provides some examples of vein distribution maps. Vein maps of the back of the hand 15 and arm 17 are shown. Also shown are three examples 19-21 of vein maps taken of human hands. As is self-evident, there are general similarities between the three human hand vein maps 19-21, but each is still distinguishable from all others.

Since the present invention is illustrated as applied to vein maps, and since maps may be in the form of vein map images, a first topic of discussion is how to identify a specific number of distinguishing features in an image. It may therefore be beneficial to first address some aspects of image processing and computer vision, particularly in the areas of feature detection and feature extraction.

In the field of computer vision, correspondence matching refers to the matching of objects (or object features or feature points or descriptors) common to two, or more, images. Correspondence matching tries to figure out which parts of a first image correspond to (i.e. are matched to) which parts of a second image, assuming that both are true images of a command subject taken at different times and/or from different view points. For example, the first image may be of a real-world scene taken from a first view angle with a first field of vision, FOV, and the second image may be of the same scene taken from a second view angle with a second FOV. Assuming that the first and second FOVs at least partially overlap, correspondence matching refers to the matching of common features points in the overlapped portions of the first and second images.

Thus, the subject of feature based correspondence matching in images, and in particular, the subject of how to identify characteristic feature points of specific objects within an image is particularly relevant to the present discussion. One example of a feature based correspondence matching algorithm is the scale-invariant feature transform, SIFT. The SIFT transform (or algorithm or process) identifies points of interest (or feature points or item descriptors) in a 2D image. A more detailed discussion of the SIFT transform is provided in U.S. Pat. No. 6,711,293 to Lowe. Essentially, the SIFT transform uses a library of training images to identify feature points that are characteristic of a specific type of object (or item class). Once a library of the object's characteristic feature points have been identified, the feature points can be used to determine if an instance of the same type of object is found in a newly received image.

Principally, feature points (i.e. item descriptors) of the object item are extracted to provide a "feature description" of a specific object item. This description, extracted from training images, can then be used to identify the specific object item in a test image containing many object-types. To perform reliable recognition, it is preferred that the features extracted from the training images be detectable under changes in image scale, noise, illumination, and rotation. To reduce the contribution of the errors caused by local variations in the average error of all feature matching errors, SIFT typically detects and uses a large number of feature points from the images. Feature points usually lie near high-contrast regions of the image.

In a typical SIFT application, feature points of object items are first extracted from a set of training images and stored in a database. An object is recognized in a new image by individually comparing each feature point from the new image to this database and finding candidate matching features based on Euclidean distance of their feature point vectors. From the full set of matches, subsets of feature points that agree on the object and its location, scale, and orientation in the new image are identified to filter out good matches. Consistent clusters of good matches are then identified. Typically, each cluster of three or more features that agree on an object and its pose is then subject to further detailed model verification and subsequently outliers are discarded. Finally the probability that a particular set of features indicates the presence of a specific object item is computed, given the accuracy of fit and number of probable false matches. Object item matches that pass all these tests can be identified as correct.

Figure 3:
FIG. 3 illustrates the identification of item descriptors in an image using a SIFT transform.

An example of a SIFT determination of feature points is illustrated in FIG. 3. Possible feature points are first identified, as indicated by dark dots in image 31. Possible feature points that have a low contrast are then discarded, as illustrate in image 33. Finally, possible features points located on edges are removed, which leaves the final set of feature points shown in image 35.

Figure 4:
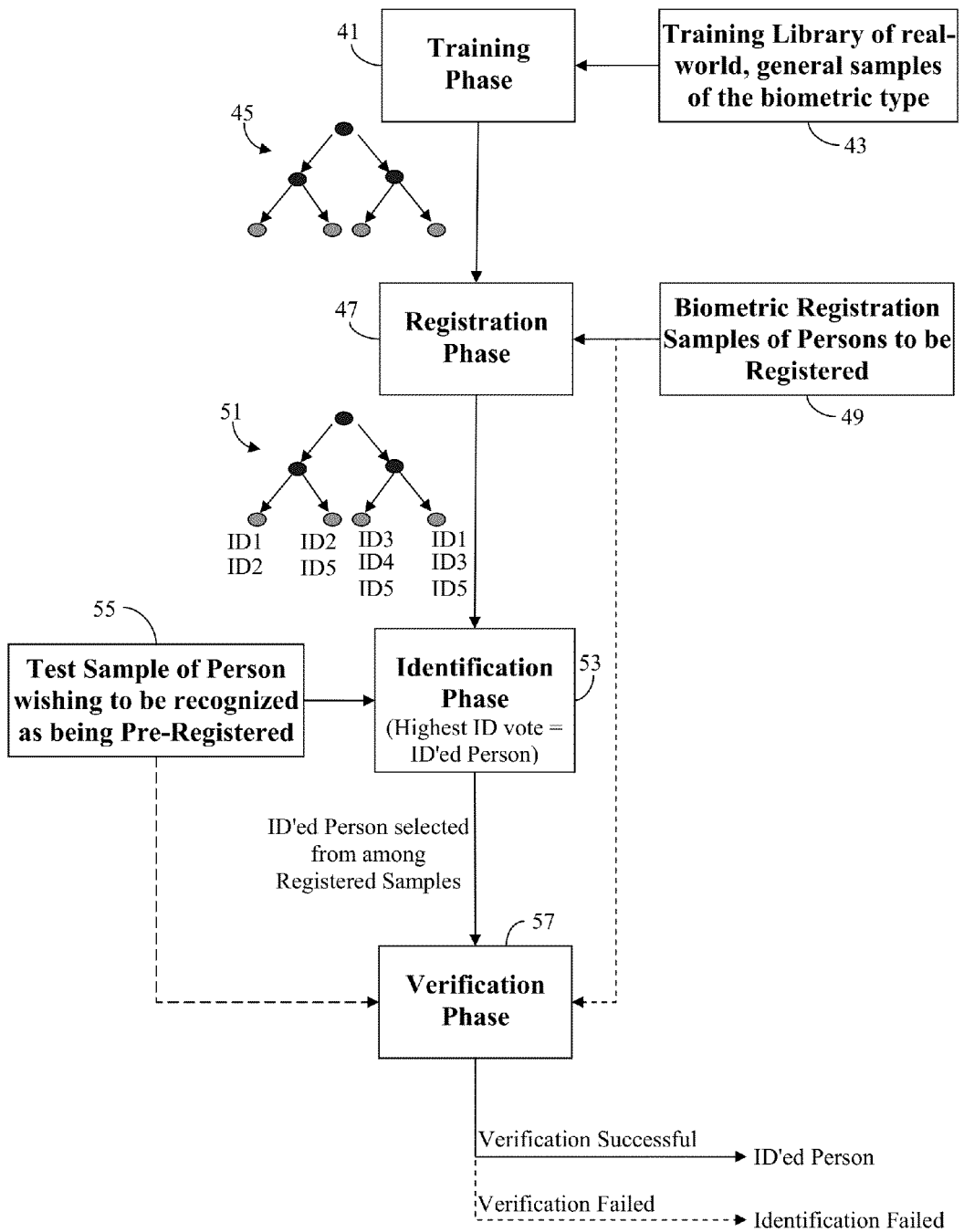
FIG. 4 provides a general overview (project flow) of the present invention.

The present invention, however, does not make use of SIFT's ability to identify and correlate similar objects in multiple images. Of more interest to the present invention is the use of the identified item descriptors (i.e., feature points or SIFT descriptors) provided by the SIFT transform. Since an objective of SIFT's algorithm is to identify similar item descriptors in two, or more, images, it is clear that each item descriptor needs to be highly distinguishable from others. This is achieved in the number of descriptive characteristics (or descriptive data) used to identify each item descriptor. In a typical SIFT transform, each item descriptor is typically characterized by 128 pieces of descriptive data. That is, each item descriptor may be thought of as a 128-dimension vector. The present invention uses SIFT only to identify item descriptors within an image, and then uses the identified sets of items descriptors in its verification process. An overview of the present invention is illustrated in FIG. 4.

One begins with a training phase (or training phase block) 41. This phase makes use of a training library 43 of real-world, item samples of the item class (i.e. the biometric type, for example) one will want to identify. Training phase 41 preferably uses a SIFT application (or some other feature identification method) to identify a separate set of item descriptors for each training image in training library 41. As is explained above, SIFT identifies as set of item descriptors for each image, and each item descriptor includes 128 pieces of descriptive data. The item descriptors of all the training images are then collected into a composite collection of item descriptors, and this composite collection is organized into a hierarchical tree structure according to relations (i.e. similarities) in the item descriptors. For example, these relations may be established by a k-means process, recursive k-means process, EM optimization process, agglomerative process, or other data clustering process. For illustrative purposes, a simplified hierarchical tree 45 having only 7 nodes (including 4 leaf nodes) is shown as the output from training phase block 41. In the present example, each of the leaf nodes would correspond to a group of item descriptors sharing some common relation, i.e., having some similar characteristic(s).

Following training phase 41 is the registration phase 47, where people that are to be registered submit, among other things, a biometric sample. That is, biometric registration samples 49 (i.e. registrable item samples) of each person to be registered are submitted to registration block 47. Each registration sample includes an identification (ID) code identifying its corresponding person. Registration phase 47 preferably uses the same feature identification technique used by training phase block 47 (i.e. SIFT in the present example) to identify a separate, and corresponding, registrable set of item descriptors for each registration sample. As before, the SIFT application identifies item descriptors for each registration sample (for example, for each registrable vein map image), and each item descriptor includes 128 pieces of descriptive data. Registration phase 47 then distributes the registrable sets of item descriptors into hierarchical tree 45 according to the relations in the item descriptors established in the creation of hierarchical tree 45. That is, the registrable sets of item descriptors are preferably distributed using the same data clustering technique used by training phase block 41). Each leaf node that receives any part of a registrable set of item descriptors also receives the ID code of the registered person to which the registrable set of item descriptors corresponds.

A simplified illustration of this is index hierarchical tree 51 shown as produced by registration phase block 47. As illustrated, each leaf node that receives any item descriptor is assigned the ID code of the registered person to which the received item descriptor belongs.

With registration thus complete, the system flows to the identification phase (or identification phase block) 53, and is now ready to be used to identify a registered person by submission of a test sample. For example, a test sample 55 (i.e. the specific biometric item of the given biometric item class) of a person wishing to be recognized as being pre-registered is submitted to the identifying phase block 53. Like before, identification phase block 53 preferably uses the SIFT application (or other feature identification method) used by training phase block 41 to identify a test set (i.e. a specific set) of test item descriptors for the test sample. As before, the SIFT application identifies item descriptors for each test sample, and each item descriptor preferably includes 128 pieces of descriptive data. Identification phase block 53 then distributes the test set of item descriptors into index hierarchical tree 51 according to the relations in the item descriptors established in the creation of hierarchical tree 45. That is, the test set of item descriptors are preferably distributed using the same data clustering technique used by training phase block 41.

The ID codes of the leaf nodes that receive any part of the test set of item descriptors are noted. In effect each noted ID code is a vote for that ID code's corresponding registered person. The ID code that is noted most often (i.e. the ID code that received the most votes) may be deemed a target ID code, since it refers to the registered person that most closely matches the test sample. However, because the present method is based on a voting method, identification phase block 53 always identifies a target ID code since it can always identify an ID code that receives the most votes. Thus, identification phase block 53 is will issue a target ID code even if the test sample 55 is from a person that is not pre-registered. Thus, the target ID code (i.e., the potentially ID'ed person) selected from among the registered samples is submitted to verification phase (or verification phase block) 57.

Verification phase block 57 then more carefully checks if the ID'ed person does indeed match the submitted test sample 55. If verification phase block 57 confirms that the ID'ed person does indeed correspond to the submitted test sample 55 (i.e. verification is successful), then the ID'ed person is issued as the registered person ID'ed as corresponding to test sample 55. If verification phase block 57 deems that the ID'ed person does not correspond to the submitted test sample 55 (i.e. verification failed) then it may issue a message stating that the identification failed, and the person who submitted test sample 55 is not recognized as being a registered person.

Verification phase bock 57 may achieve this in a number of ways, described in more detail below. For example, it access the test sample and directly compare it to the full registration sample corresponding to the ID'ed person, as illustrated by dotted lines. This may use more traditional image comparison techniques. Alternatively, it may check if the number of votes of the target ID code exceeds the numbered of votes received by the ID code that is noted the next most often. If the difference in votes is greater than a predefined threshold, then the target ID code may be confirmed as verified, otherwise verification may be deemed to have failed.

The training phase 41 is described in more detail in FIGS. 5 to 9. The main idea is to cluster visual feature data hierarchically in a tree structure using a method such as k-means or canopy clustering to create a fast inverted index for use in recognition and authorization applications.

Figure 5:
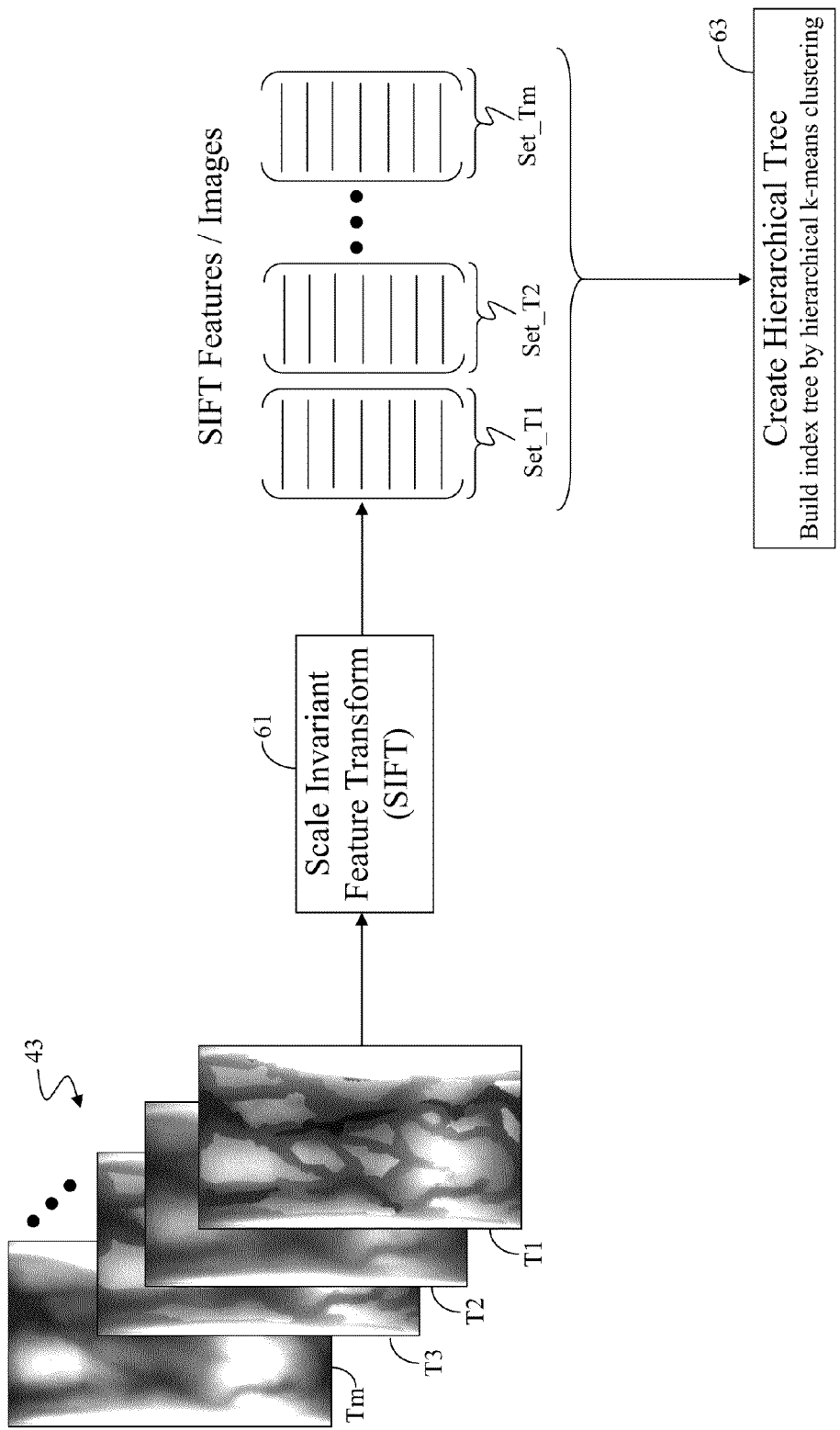
FIG. 5 illustrates the extraction and use of item descriptors (feature points) from a general library of training images of a given item class.

With reference to FIG. 5, training library 43 consists of m training images T1 though Tm (i.e. m item samples), each being a true image of a real-world example of the desired biometric type (or other item class). In the present example, the biometric type is a finger vein map, such as can be obtained by means of an IR camera sensor. Thus, training images T1 to Tm are images of true finger vein maps taken from a general population. Each of training images T1 to Tm is submitted to an application to identify a set of item descriptors. In the present example, this is achieved by means of a scale-invariant feature transform (SIFT) processing block 61, which outputs a separate set of item descriptors (Set_T1 to Set_Tm) for each of training images T1 to Tm, respectively. Preferably, each set of item descriptors Set_T1 to Set_Tm consists of N item descriptors.

The separate sets of item descriptors Set_T1 to Set_Tm are then submitted to a Create Hierarchical Tree block/process step 63, where they are collected into a composite collection of item descriptors and organized into a hierarchical tree structure according to relations (similarities) in the item descriptors.

Figure 6:
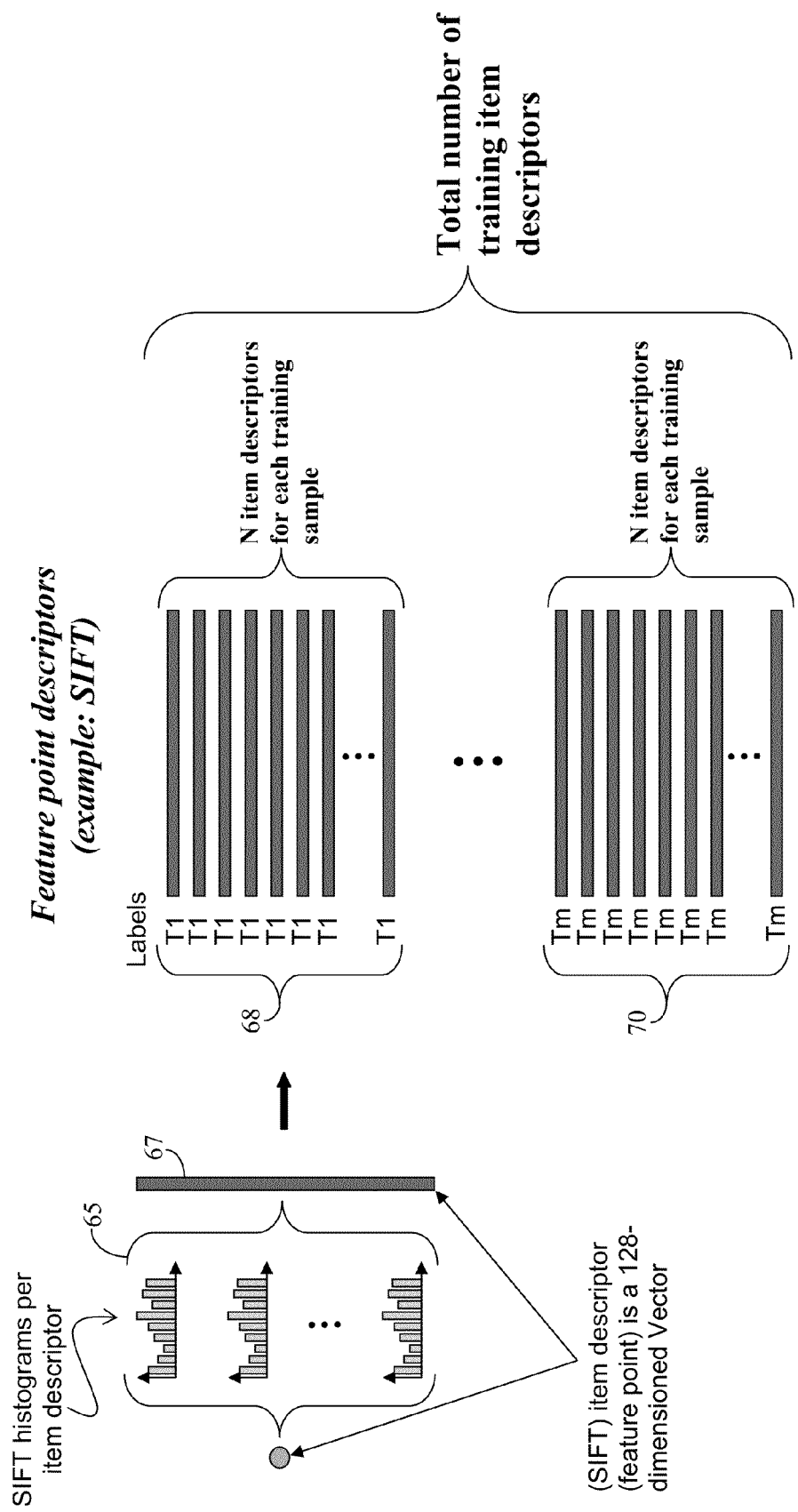
FIG. 6 illustrates the organization of item descriptors generated (feature points) using the SIFT transform.

A quick overview of SIFT block 61 is illustrated in FIG. 6. As is known in the art, a typical SIFT processing algorithm creates a series of SIFT histograms 65 to describe each identified item descriptor (or feature point or SIFT descriptor). Each of SIFT histograms 65 statistically describes a distinguishing characteristic of the item descriptor within a neighborhood of pixels surrounding the item descriptor in the image being processed. The series of SIFT histograms 65 are then collected into one vector 67, which constitutes one item descriptor. Each vector 67 describes an item descriptor (i.e. feature point) and consists of 128 pieces of descriptive data. Thus, each item descriptor is characterized by a 128-dimensioned vector 67.

The item descriptors may be labeled to identify the image from which they were extracted. In the present example, group 68, is the group (or set) of item descriptors from first training image T1, and group (or set) 70 is the group of item descriptors from the last training image Tm. The SIFT descriptors corresponding to any given training image constitutes a set of item descriptors for that training image. For example, training image T1 is shown to have a set of N item descriptors. If desired, all images may be made to have the same number of item descriptors. In this case, all training images would each have a set of N item descriptors.

In the presently preferred embodiment, all the sets of items descriptors are collected into a composite collection of item descriptors, which is then used to construct a hierarchical tree. One method of achieving this is through a recursive k-means application, as is illustrated in FIG. 7-9.

Figure 7:
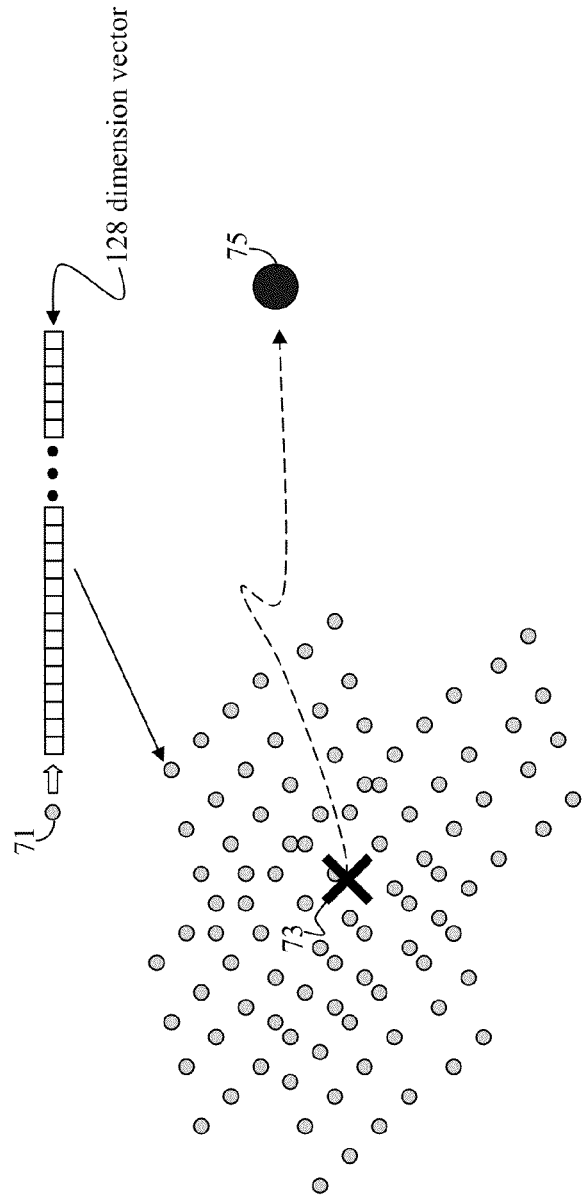
FIGS. 7 to 9 illustrate the organizing of item descriptors from the training library into a hierarchical tree structure using a recursive k-means technique.

With reference to FIG. 7, although each item descriptor, such as point 71, is a 128-dimension vector, for ease of illustration a clustering of lower-dimensioned item descriptors under a single center (preferably the mean value) is shown. This mean value point 73 may define the root node 75 of the hierarchical tree that is to be constructed.

Figure 8:
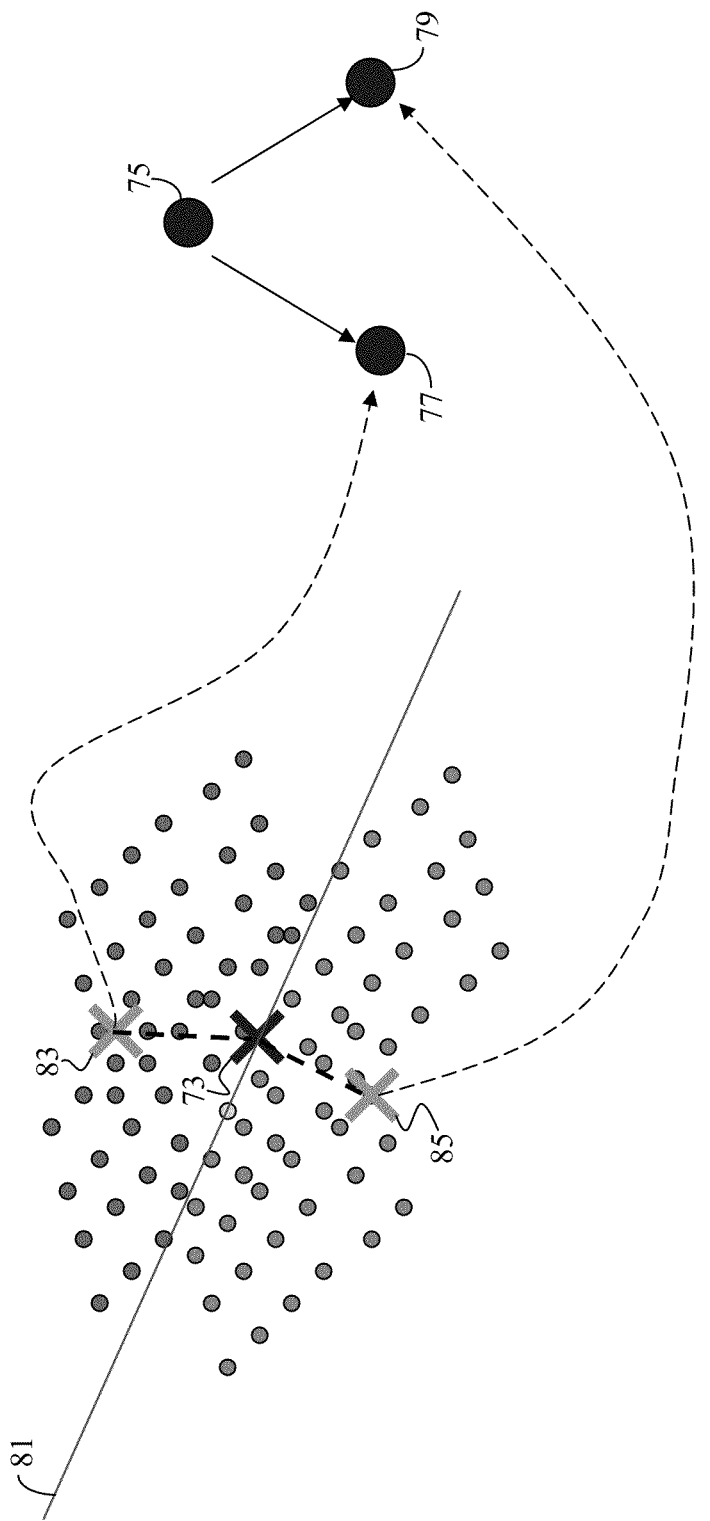

As illustrated in FIG. 8, the item descriptor data is then split into two groups (as illustrated by dividing line 81) along mean point 73, and new center points 83 and 85 determined for the two newly created groups of data are created. As before, these new center points 83 and 85 may be the defined by the mean of their respective groups of data. Each of center points 83 and 85 may then define two child-nodes 77 and 79, respectively under root node 75.

Figure 9:
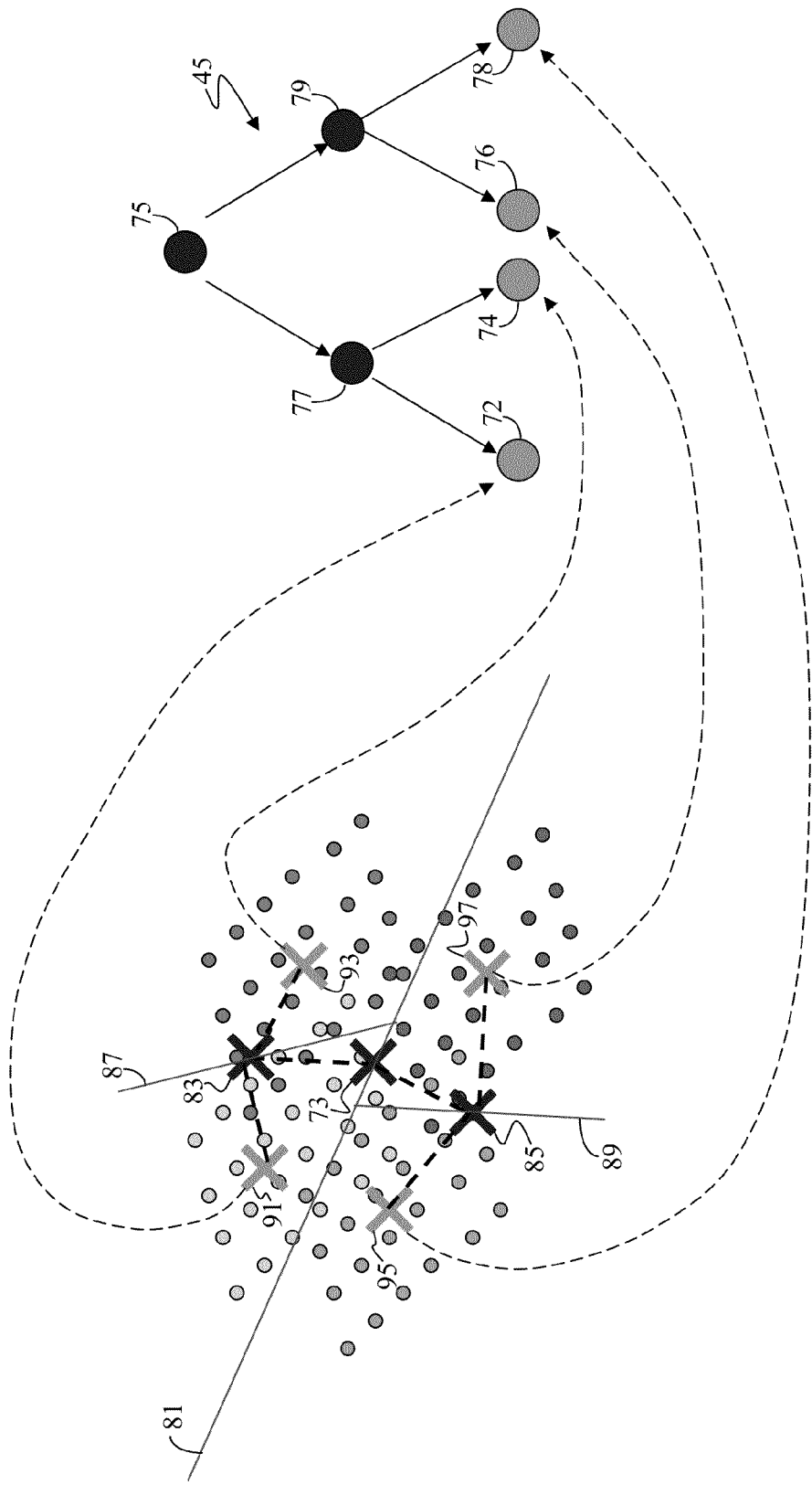

With reference to FIG. 9, each of the two groups of groups of data may then be divided along their respective center points 83 and 85, as illustrated by dividing lines 87 and 89, respectively. This results in four newly created groups of data, each of which defines a new respective center point 91, 93, 95 and 97. As before, center points 91, 93, 95 and 97 may be defined by the means of their respective group of data. Center points 91, 93, 95 and 97 may then define respective child-nodes 72, 74, 76 and 78 under nodes 77 and 79 in hierarchical tree 45. It is to be understood that the data may continue to be divided to define additional child-nodes in simplified hierarchical tree 45.

In an hierarchical tree structure, as it is known in the art, the root node is the top-most node in the hierarchical tree, a parent node is a node that has at least one other node below it and linked to it, a child node is a node linked to a parent node above it, and a leaf node is a node with no child nodes below it. A leaf node is effectively a bottom-most node along a link path (or branch path) downward from the root node. Thus, in the example of simplified hierarchal tree 45, node 75 is the root node, nodes 77 and 79*a* are intermediate nodes (i.e. nodes linked to a parent node above them and linked to a child node below them), and nodes 72, 74, 76 and 68 are leaf nodes.

Figure 10:
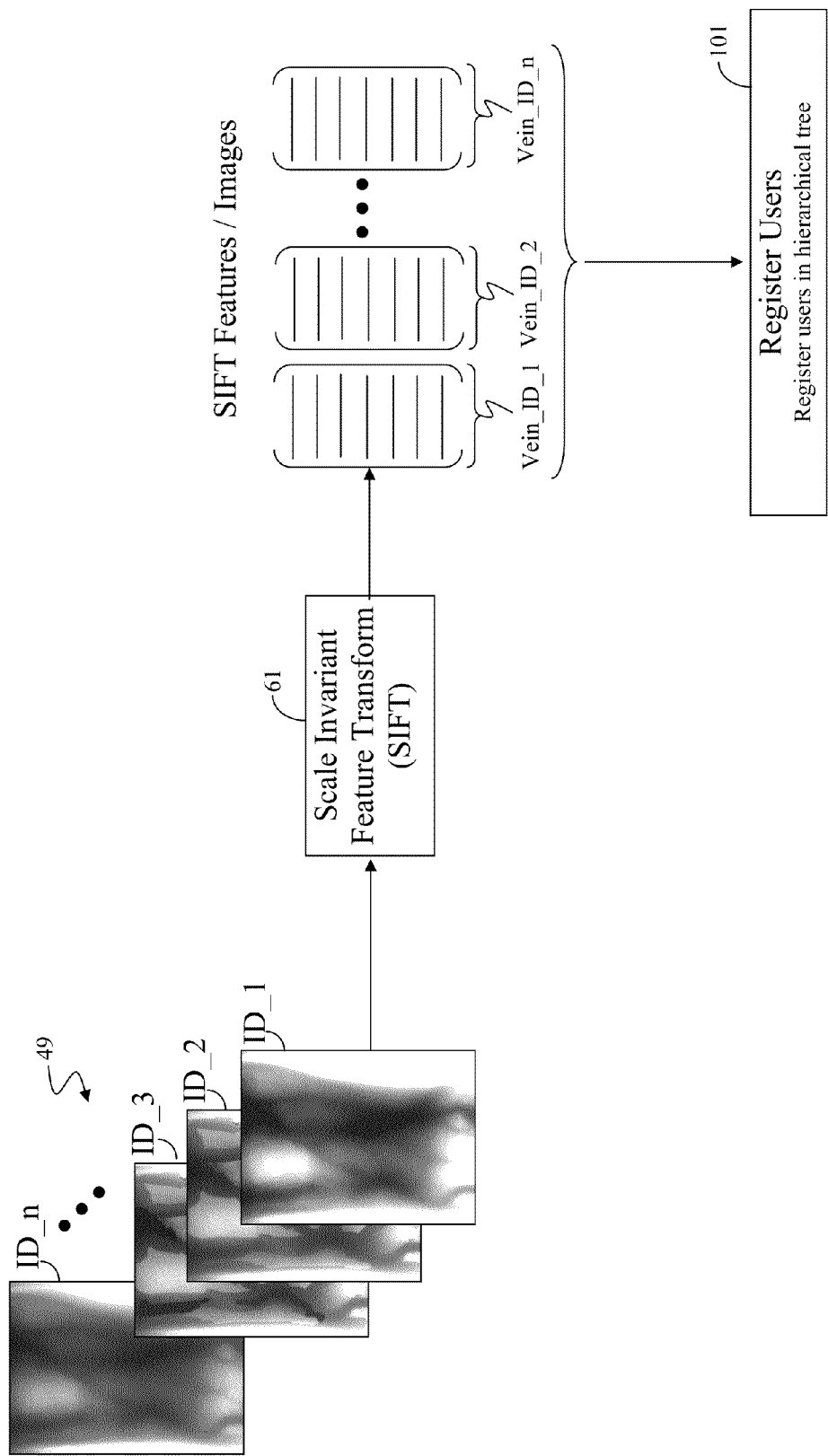
FIG. 10 illustrates the extraction and use of item descriptors from a registration library of register images corresponding to persons that are to be registered.
Figure 11:
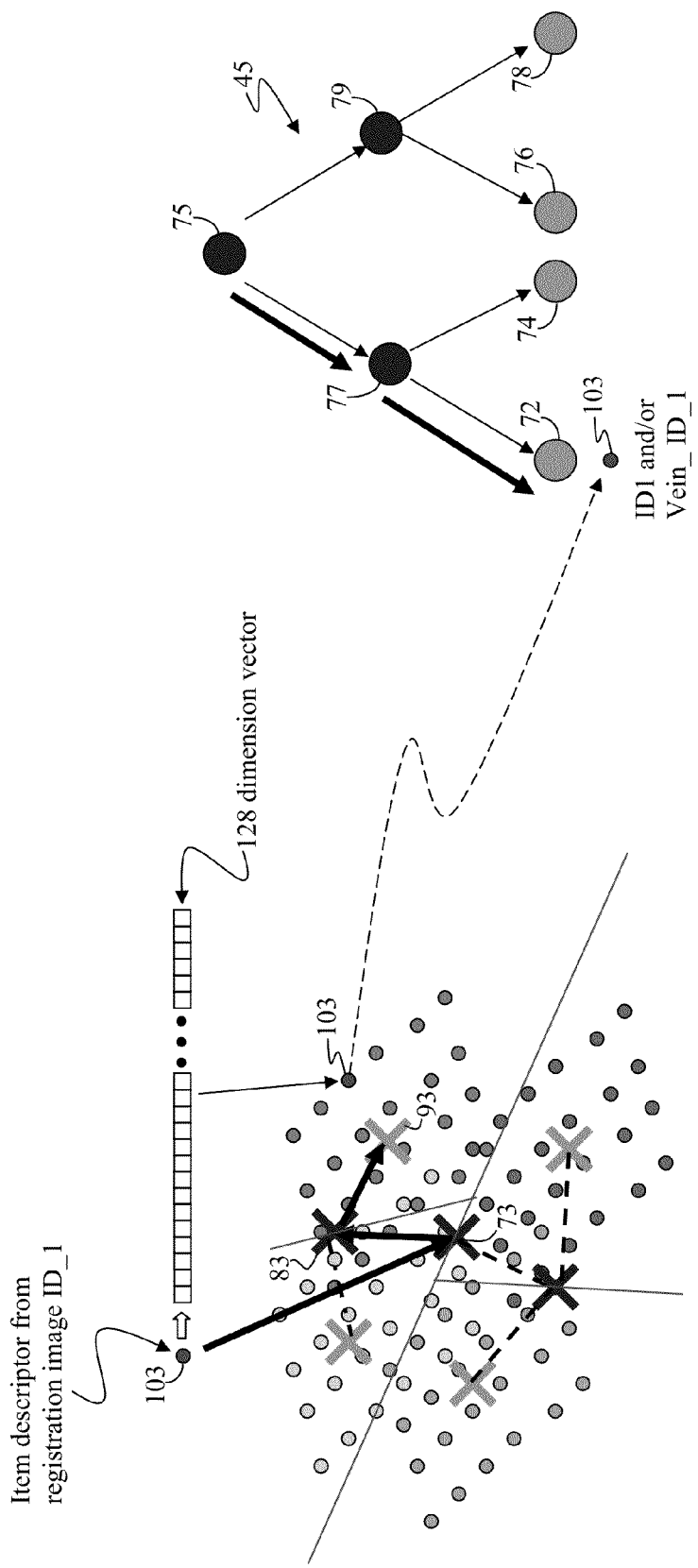
FIGS. 11 and 12 illustrate the distribution of the item descriptors from the registration library into the hierarchical tree of FIGS. 7 to 9 to create an index hierarchical tree.
Figure 12:
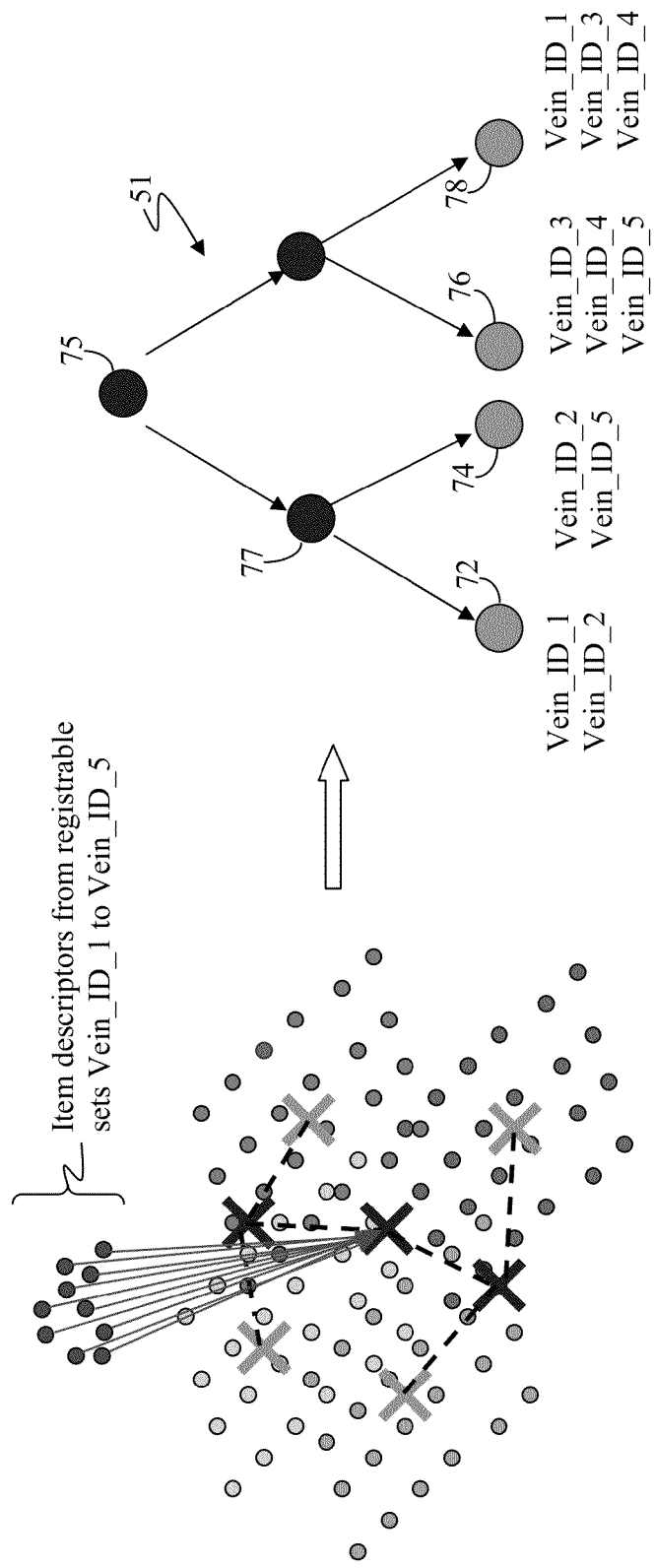

The registration phase 47 of FIG. 4 is described in more detail in FIGS. 10 to 12. For ease of discussion, the simplified hierarchical tree 45 is used to illustrate the principle of registration phase 47. Basically, users are registered by searching the training descriptor hierarchical tree 45, and recording label information (i.e. ID code) at leaf nodes that receive an item descriptor of a registration sample. The label information is preferably the identification (ID) code that identifies the registration sample's corresponding person.

With reference to FIG. 10, where for ease of discussion all elements similar to those of FIG. 5 have similar reference characters and are described above, library of biometric registration samples 49 includes at least one biometric registration sample per person that is being registered. In the present example, it is assumed that each of n persons being registered each submitted one registration sample, ID_1 to ID_n, respectively. In the present example, the biometric type is a finger vein map, such as can be obtained by means of an IR camera sensor, but registration samples ID_1 to ID_n may differ in size or view angle from those of training library 43. As before, each of registration sample (i.e. registration images or registrable item samples) ID_1 to ID_n is submitted to an application to identify a registrable set of item descriptors for each registration sample. As before, this is achieved by means of a scale-invariant feature transform (SIFT) processing block, such as block 61, which outputs a registrable sets of item descriptors (Vein_ID_1 to Vein_ID_n) for each of registration images ID_1 to ID_n, respectively. Preferably, each of the registrable sets of item descriptors Vein_ID_1 to Vein_ID_n consists of N item descriptors.

The registrable sets of item descriptors Vein_ID_1 to Vein_ID_n are then submitted to a Register User process step/bloc 101, where they are distributed into hierarchical tree 45. Each leaf node of hierarchical tree 45 that receives any part (i.e. receives an item descriptor) of a registrable set of item descriptors also receiving the ID code (i.e. label) of the registrable item corresponding to the registrable set of item descriptors to which the received part belongs. The result of distributing the registrable sets of item descriptors Vein_ID_1 to Vein_ID_n into hierarchical tree 45, is registered (i.e. index) hierarchical tree 51. The principle of this process of populating the leaf nodes of hierarchical tree 45 to construct registered (i.e. index) hierarchical tree 51 is illustrated in FIGS. 11 and 12.

With reference to FIG. 11, item descriptor 103 from registration image ID_1 is distributed into the data cluster that defined hierarchical tree 45. Like before, item descriptor 103 is a 128-dimension vector. In the present example, it is assumed that item descriptor 103 distributes/sorts into the data group defined by center point 93. As is explained above, center point 93 corresponds to leaf node 72. Consequently, item descriptor 103 is distributed to leaf node 72, and leaf node 72 is receives (is assigned) the ID code (or label) of the registration image to which item descriptor 103 belongs. In the present example, the set of item descriptors that come from registration image ID_1 are labeled as Vein_ID_1, and so leaf node 72 received label Vein_ID_1. Alternatively, leaf node 72, may receive any label associated with registration image ID_1, such as "ID_1" or simply ID1.

For the sake of completeness, FIG. 11 also shows that item descriptor 101 starts at center point 73, which corresponding to root node 75. Its distribution path then goes from center point 73 to the date group defined by center point 83 (corresponding to a path from root node 75 to intermediate node 77), and from center point 83 to the area defined by center point 93 (corresponding to a path from intermediate node 77 to leaf node 72). The distribution path of each item descriptor is preferably defined by similar rules that defined the data cluster of training data (i.e. recursive k-means).

With reference for FIG. 12, the results of distributing 10 item descriptors from five registrable sets of item descriptors (labeled Vein_ID_1 to Vein_ID_5) are illustrated. This results in index hierarchical tree 51. It is to be understood that a real-world registrable set of item descriptors could have hundreds or thousands of item descriptors.

Figure 13:
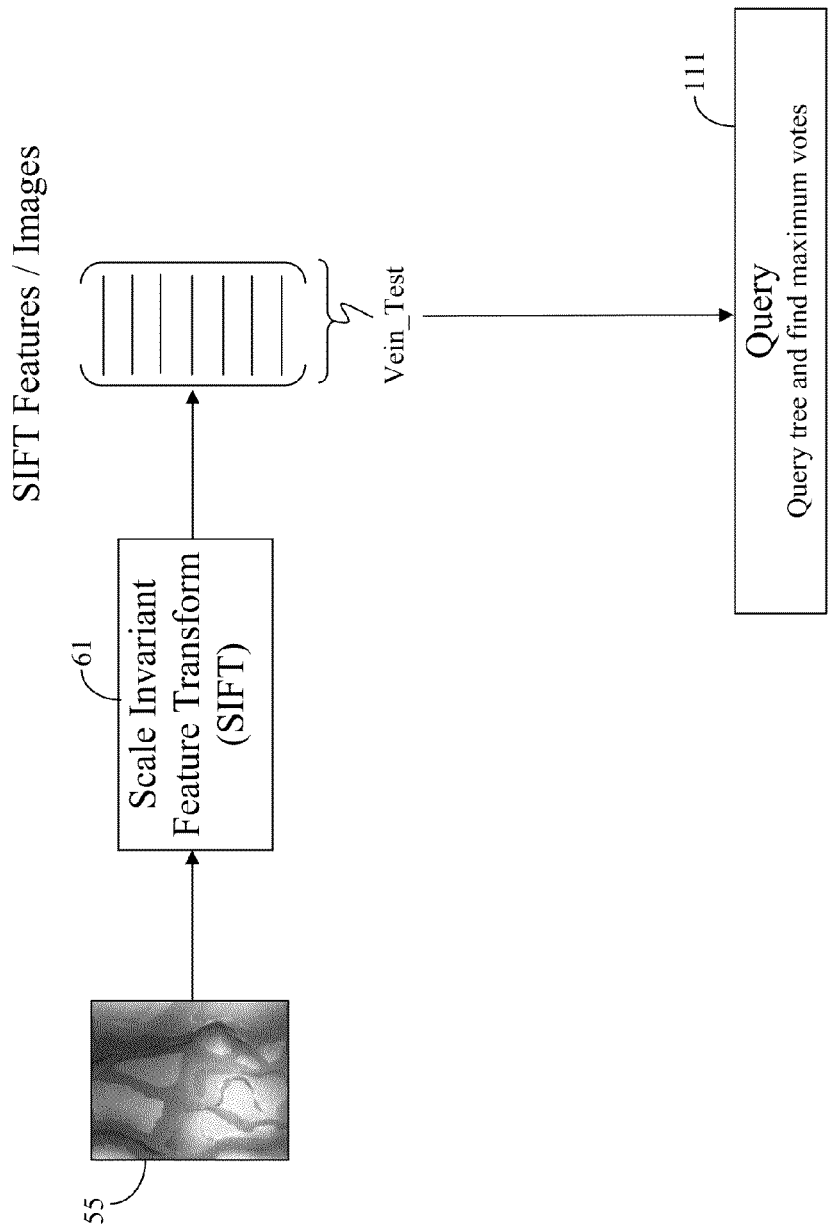
FIG. 13 illustrates the extraction and use of item descriptors from a test image of a person wishing to be identified/verified as being pre-registered.

The identification phase 53 of FIG. 4 is described in more detail in FIG. 13. A test sample 55 (i.e. the specific biometric item of the given biometric item class) of a person wishing to be recognized as being pre-registered is received. In deployed systems, the IR camera sensor may be smaller than the finger resulting in only a partial vein image for querying. Thus, test sample 55 is shown to cover a smaller area than those of training library 43 or library 49 of registrable samples.

Like before, identification phase block 53 a feature identification method, such as SIFT block 61 to identify a test set (i.e. a specific set) of test item descriptors (Vein_Test) for test sample 55. As before, each item descriptor preferably includes 128 pieces of descriptive data. Test set Vein_Test is then submitted to Register Users block 111, which distributes the item descriptors within test set Vein_Test into index hierarchical tree 51 according to the relations in the item descriptors established in the creation of hierarchical tree 45. That is, the test set of item descriptors are preferably distributed using the same data clustering technique used by training phase block 41.

Each leaf node that receives an item descriptor from test set Vein_Test, provides a vote for all the labels that reside within it (as illustrated in FIG. 12. The label (or ID code) that receives the most votes may be deemed a target ID code (or the match), since it refers to the registered person that most closely matches/resembles the test sample.

Basically, identification phase block 53 follows four steps. First, is to compute feature locations and descriptors (i.e. item descriptors) in the test image (i.e. in a new vein image). Second, is to search the index tree with each item descriptor and lookup registered labels at each encountered leaf node. Third is to accumulate votes for each label depending on the number of times the label is seen during this query process.

Fourth, is to deem as the recognized user, the registered user corresponding to the label (i.e. ID vote) with the highest number of votes.

Figure 14:
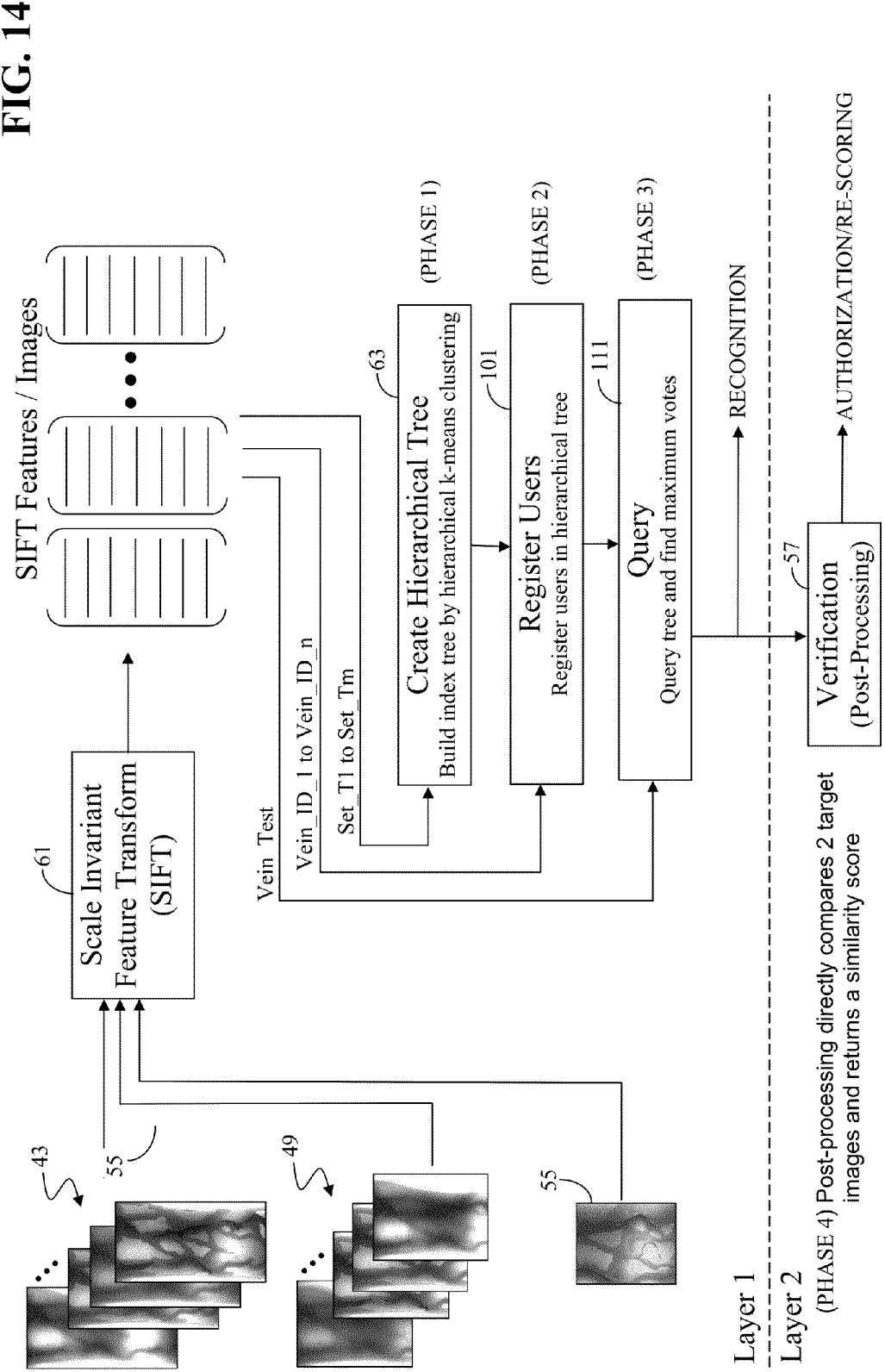
FIG. 14 is another overview of the present invention broken down into two layers.

As is explained above, however, the present invention further includes verification phase 57 (shown in FIG. 4) to verify the results of identification phase 53. An overview of a simplified implementation of the present invention, broken down into four phases (PHASE 1 to PHASE 4), including the verification phase (Phase 4) is illustrated in FIG. 14. All elements similar to those of FIGS. 1-13 have similar reference characters and are described above.

FIG. 14, divides the present invention into a Layer 1, which includes PHASES 1-3, and Layer 2, which includes PHASE 4. Layer 1 is associated with the phases needed to recognize a submitted test image 55 as belonging to a registered person.

PHASE 1 corresponds to the training phase, and it includes submitting training library 43 to SIFT block 61 to define training sets of item descriptors Set_1 to Set_m. These training sets of item descriptors are submitted to Create Hierarchical Tree block 63 to create hierarchical tree 45 (not shown).

PHASE 2 corresponds to the registration phase, and it includes submitting registration library 49 of registration samples to SIFT block 61 to define registration sets of item descriptors Vein_ID_1 to Vein_ID_n. These registration sets of item descriptors are submitted to Register User block 101 to create index hierarchical tree 51 (not shown).

PHASE 3 corresponds to the identification phase, and it includes receiving a test image 55 of a person whishing to be recognized as a registered person. Test image 55 is submitted to SIFT block 61 to define a test set of item descriptors, Vein_Test. Query block 111 receives test set Vein_Test and distributes its item descriptors into the index hierarchical tree 51 and makes note of the leaf nodes that receive any item descriptor within test set Vein_Test. The leaf nodes that receive an item descriptor from test set Vein_Test submit as votes the labels of all registered images that are represented within it. This phase outputs a "RECOGNITION" signal for the registered person whose corresponding registered image received the most votes.

PHASE 4 corresponds to the verification phase, and it improves recognition and provides authorization functionality. This extra processing can be used to re-rank the results and/or provide authorization capability.

The verification phase can be implemented in a number of ways. Four methods are provided herein by way of example.

Figure 15:
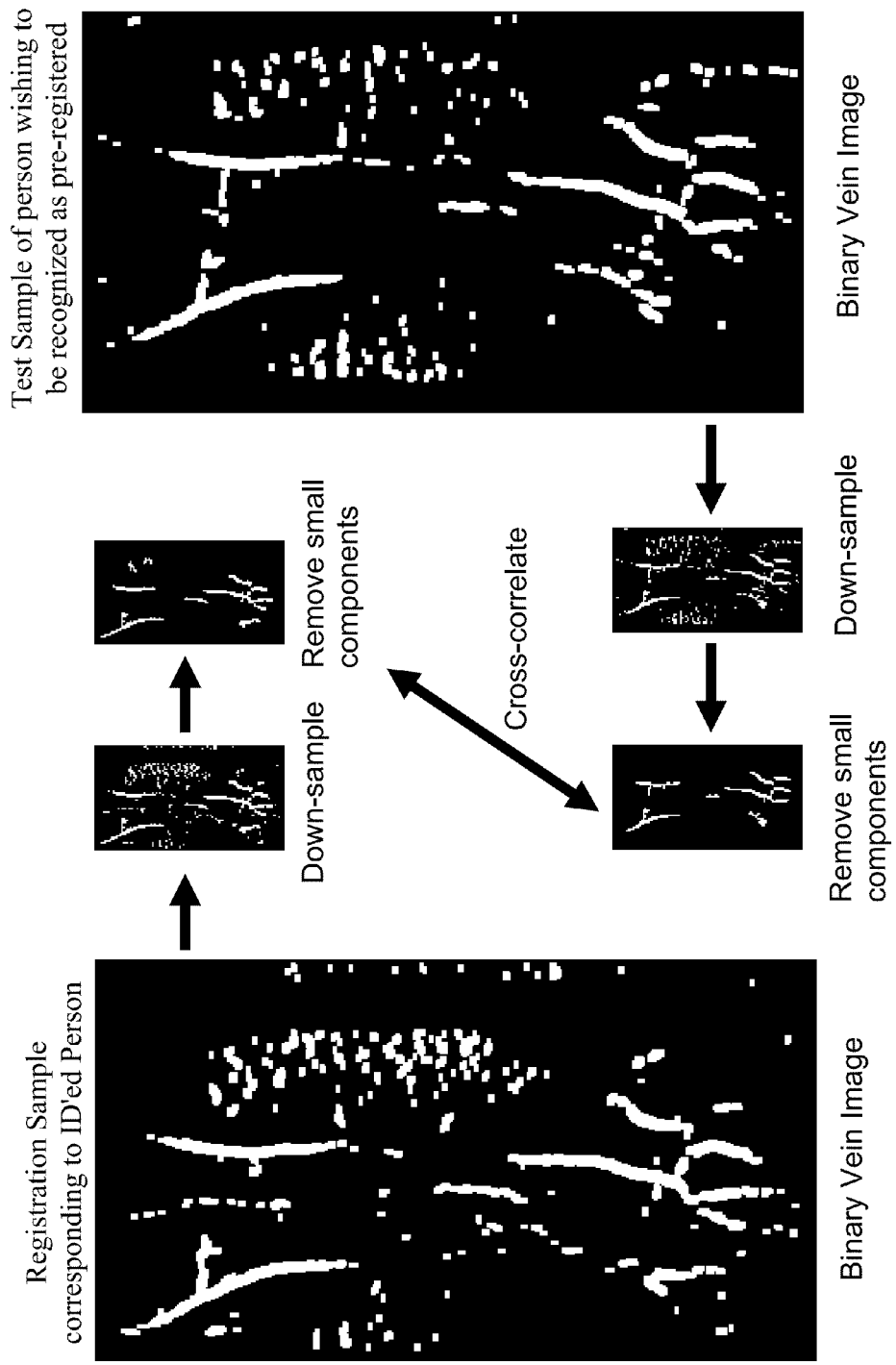
FIGS. 15 to 17 illustrate methods of cross-correlating binary images.
Figure 16:
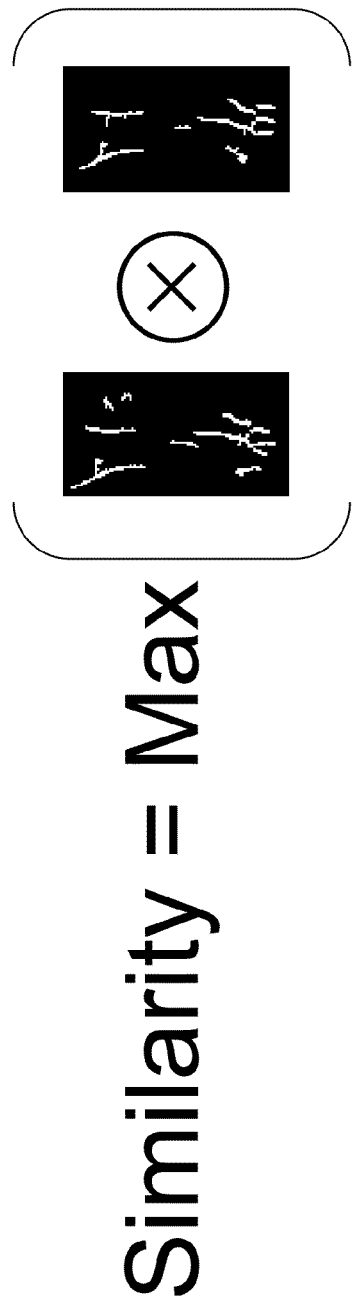
Figure 17:
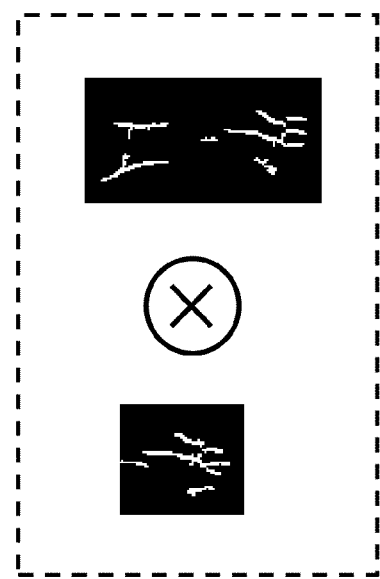

With reference to FIGS. 15, 16 and 17, a first method is to use the processed, binary infrared finger vein images of the test sample and of the registration samples that received the top most votes to evaluate the cross-correlation value among a number of the top returned images. It is to be understood that down-sampled versions (including removal of small components—smaller than a predefined number—) of the binary infrared finger vein images may be cross-correlated. This correlation basically examines the images to assure that the binary images are consistent, i.e. look similar after binary operations. For example, in FIG. 16, the operation may be defined as:

$$(f*g)[n] \stackrel{def}{=} \sum_{m=-\infty}^{\infty} f*[m]g[n+m]$$

Cross-correlation values can be used to re-rank the images and perform authorization. A threshold is used to determine a match or a non-match. As illustrated in FIG. 17, this technique can be extended to patch matching. It is noted that other shape distance metrics may be used to compare binary images.

Figure 18:
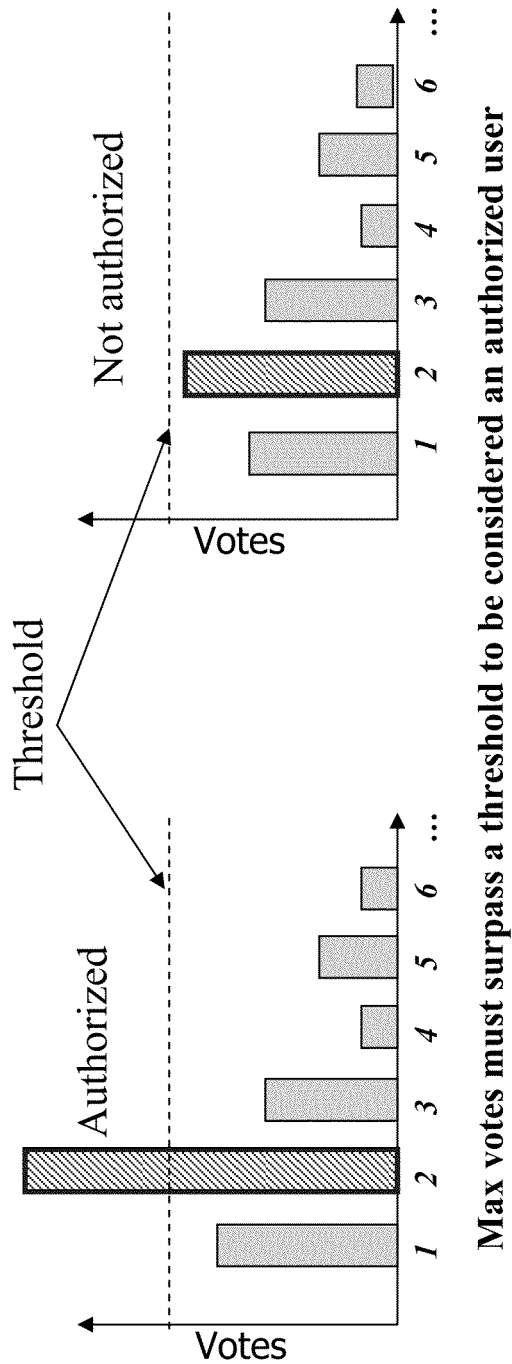
FIGS. 18-20 illustrate methods to analyze the number and distribution of votes to determine if the user is authorized.

A second method is to analyze the number and distribution of votes to determine if the user is authorized. For example as shown in FIG. 18, a threshold of minimum votes may be established. If a the registered image (i.e. image 2 in the graphs of FIG. 18) that receives the most votes does not received enough votes to reach above the minimum threshold of volts (as illustrated in the right-most histogram in FIG. 18), then that registered image is rejected and the test image is likewise rejected as not belonging to any registered person. But if the registered image 2 does received more votes than the threshold (as illustrated by the left-most histogram in FIG. 18), then the registered image is verified, and the test image is deemed to match the registered person corresponding to registered image 2.

Figure 19:
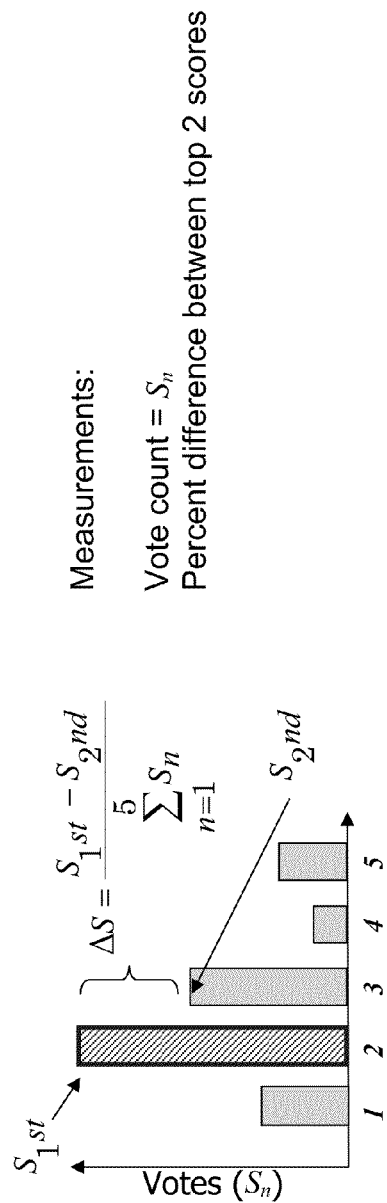
Figure 20:
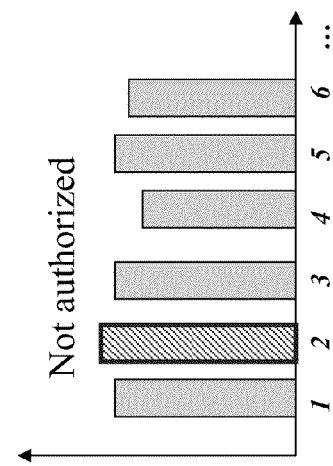

Alternatively in this second method, the difference between the top 2 returned results may be used as a percentage of the total number of votes in a number of the top returned results, as is illustrated in FIGS. 19 and 20. This approach accumulates votes and rank based on the maximum number of votes. As illustrated in FIG. 19, a percent difference between the top 2 scores is then computed to determine authorization. This approach can also be used to compute a confidence score. As long as the computed confidence level is above a predetermined minimum, the registered that received the most votes can be verified. For example, in FIG. 20, the calculated confidence in the registered image that received the maximum votes is low because the difference between the top two vote-getters is small (i.e. below a predefined minimum). Consequently, the registered image of FIG. 20 is not verified as the corresponding to the test image.

A third method is to train a support vector machine (SVM) classifier to authorize or deny the top returned result. For example, the SVM may be used to directly compare the test image to the registered image that received the most votes in the query phase, or to a predefined number of the top vote-getting registered images. Alternatively, the SVM can be used to determine if the test image is even of the right object type (i.e. the right kind of biometric type) of the registered images (i.e. of the type in the index hierarchical tree). Further alternatively, the SVM can be used to determine if the test image more closely resembles select registered images (for example the top vote-getters) or more closely resembles the general training library of samples (i.e. the world model).

Figure 21:
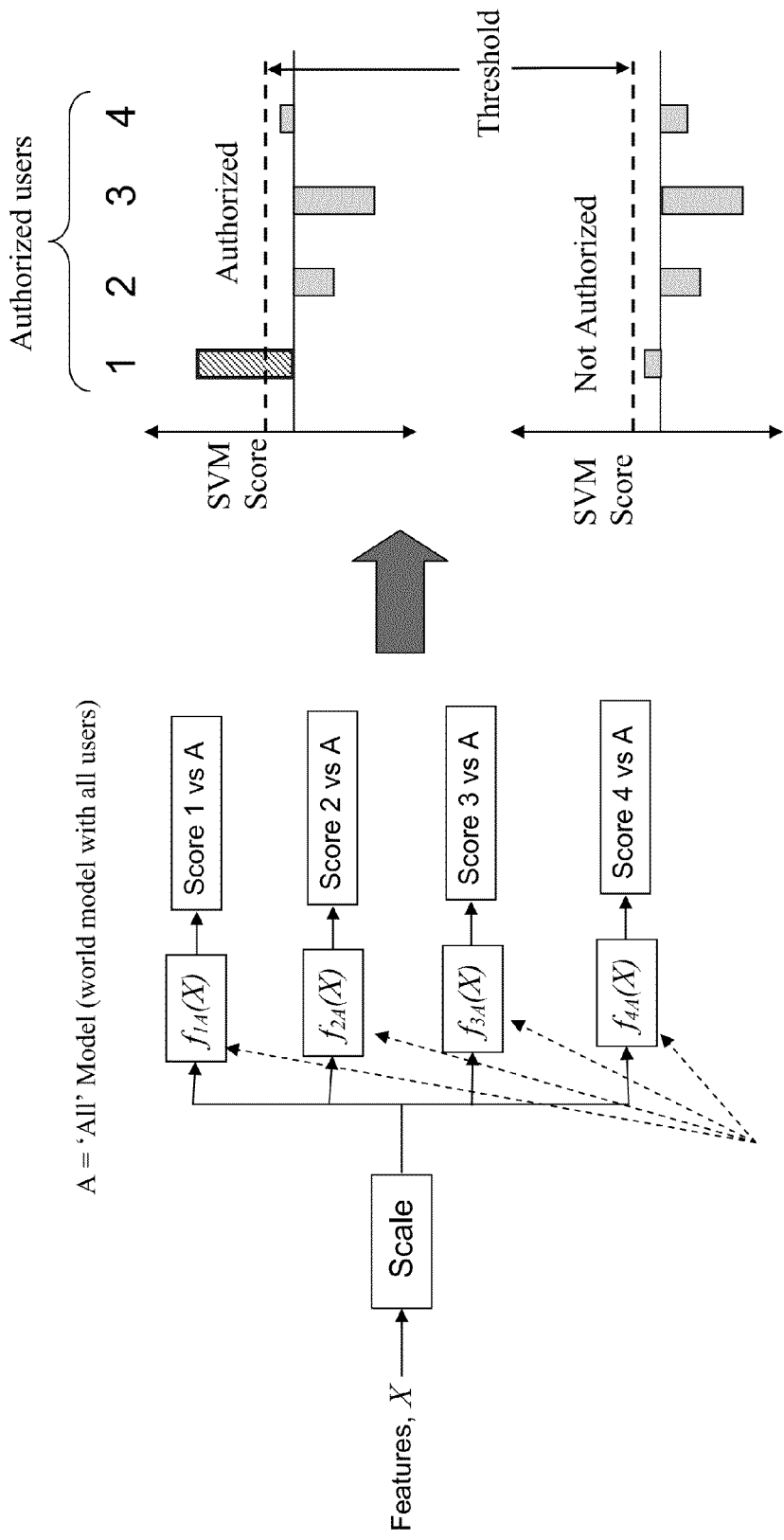
FIG. 21 illustrates the use of SVM in a verification process in accord with the present invention.

An example of using an SVM classifier is illustrated in FIG. 21. SVM classifiers compare each ID to a World model. Higher scores mean it is more likely that the features came from an authorized class. Negative scores mean it is more likely the feature came from the World class (unauthorized).

A fourth method is to use multiple training/query samples to learn probability distributions of vein image features and evaluate similarity using KL-divergence or Bayesian model. These methods can be used to re-rank and authorize finger vein images given a sequence of finger vein images.

For example, using the Bayesian Rule (max posteriori), the item descriptors are clustered on location, scale, and value. The training of multiple training images is used to compute the probability of different registered users generating the observed feature descriptors. One then maximizes the probability of generating observed features by class, ci. Verification can then be determined by determining if P(f|ci) greater than that of a World model, P(f|cw) or greater than a predefined threshold. This can be implemented as follows:

$$\frac{P(f \mid c_i)}{P(f \mid w)} > 1 \rightarrow \log(P(f \mid c_i)) - \log(P(f \mid w)) > 0$$

An example of using KL-divergence is as follows. Given a sequence of query images (for example, a video), build feature distribution histogram for query image. Then, measure the distance from the query distribution to individual distributions and the world distribution (e.g., KL Divergence), $$[fq1, fq2, \ldots fqN] \rightarrow Q$$

For example, this can be defined as:

$$S_w = D(Q \| P_w) + D(P_w \| Q)$$

$$S_i = D(Q \| P_i) + D(P_i \| Q)$$

$$S_i < S_w$$

Where Q=query distribution, Pi=probability distribution for person "I" (a particular person), and Pw=probability distribution for the world model.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A method of identifying a specific item within an item class, said method comprising:
    (a) from a training library of training samples of said item class, generating a separate set of training item descriptors for individual training samples in said training library;
    (b) collecting the separate sets of training item descriptors into a single composite collection of training item descriptors;
    (c) organizing said composite collection of training item descriptors into a hierarchical tree structure according to relations in the training item descriptors;
    (d) accessing a collection of registrable item samples belonging to said item class, each registrable item sample being a representation of a different target item and having a unique registration identification (ID) code identifying its corresponding target item, at least one of said target items being a sample of said specific item;
    (e) generating a separate, and corresponding, registrable set of registration item descriptors for each of said registrable item samples, each registration item descriptor identifying the registration ID code of the registrable item from which it is generated;
    (f) distributing the registrable sets of registration item descriptors into nodes of said hierarchical tree according to said relations in the training item descriptors by which said hierarchical tree is organized, wherein each registration item descriptor defines an index between the node to which it distributes and the registration ID code it identifies;
    (g) accessing said specific item, identifying a specific set of item descriptors for said specific item, distributing said specific set of item descriptors into nodes of said hierarchical tree according to said relations in the training item descriptors by which said hierarchical tree is organized, noting the registration ID codes that are indexed to the nodes that receive any part of said specific set of item descriptors, identifying the registration ID code that is noted most often as a target ID code;
    (h) identifying as said specific item, the target item corresponding to said target ID code;
    wherein step (g) further includes:
    (i) identifying as top choices a plurality of the most often noted registration ID codes including said target ID code;
    (ii) cross-correlating the registrable item samples corresponding to the top choices to said specific item to determine if any match said specific item;
    (iii) IF a match is found in step (ii),
    THEN reassigning as said target ID code to the registration ID code of registrable item that matches said specific item and proceeding to step(h),
    ELSE concluding that none of said collection of unique registrable item samples is representative of said specific item and omitting step (h);
    wherein step (ii) includes:
        down-sampling the registrable item samples corresponding to the top choices, and removing any components not bigger than a predefined minimum size;
        down-sampling said specific item, and removing any components not bigger than a predefined minimum size;
    and comparing the resultant registrable item samples to the resultant specific item using a binary match method.

2. The method of claim 1, wherein in step (a), said training library is extracted from a general library of said item class and excludes samples of said specific item.

3. The method of claim 1, wherein in step (f), said registrable sets of registration item descriptors are all distributed into the leaf nodes of said hierarchical tree according to said relations in the training item descriptors by which said hierarchical tree is organized.

4. The method of claim 3, wherein in step (f), the distributing of the registrable sets of registration item descriptors into the leaf nodes of said hierarchical tree does not alter the branch structure of said hierarchical tree.

5. The method of claim 3, wherein in step (g), the item descriptors in the specific set of item descriptors all distribute to leaf nodes of said hierarchical tree.

6. The method of claim 1, wherein said item class is a mapping of data, and said data constitutes one of a political map, climate map, road map, economic resource map, or topographic map.

7. The method of claim 1, wherein in step (c), said relations in said item descriptors are based on a recursive k-means organization that limits each parent node of the hierarchical tree to not more than two children nodes.

8. A biometric identification method identifying a registered individual by an input biometric image, comprising:
    (a) from a training library of biometric training images of a predefined biometric type, identifying a separate and corresponding set of training item descriptors for the biometric training images;
    (b) collecting the separate sets of training item descriptors into a single composite collection of training item descriptors;
    (c) organizing said composite collection of training item descriptors into a hierarchical tree structure according to relations in the training item descriptors;
    (d) accessing a collection of unique registrable biometric images not including said input biometric image, of said biometric type, and taken from individuals to be registered for later identification, each registrable biometric image having a registration identification (ID) code identifying its corresponding individual;

(e) generating a, separate and corresponding, registrable set of registration item descriptors for the registrable biometric images, each registration item descriptor identifying the registration ID code of the registrable biometric images from which it is generated;

(f) distributing the registrable sets of registration item descriptors into the leaf nodes of said hierarchical tree according to said relations in the training item descriptors by which said hierarchical tree is organized, wherein each registration item descriptor defines an index between the leaf node to which it distributes and the registration ID code it identifies;

(g) accessing said input biometric image, identifying a test set of item descriptors for said input biometric image, distributing said test set of item descriptors into the leaf nodes of said hierarchical tree according to said relations in the training item descriptors by which said hierarchical tree is organized, noting the registration ID codes that are indexed to leaf nodes that receive any part of said test set of item descriptors, identifying the registration ID code that is noted most often as a target ID code;

(h) identifying as said registered individual, the individual corresponding to said target ID code wherein:

in step (a), the biometric training images are subjected to a scale-invariant feature transform (SIFT) to produce SIFT feature descriptors, said SIFT feature descriptors being said set of image descriptors;

(i) all of said SIFT feature descriptors have the same types and number of item descriptors;

(ii) in step (b), the composite collection of item descriptors s formed by collecting all the SIFT feature descriptors into a common mapping space;

(iii) in step (c), the composite collection of item descriptors are divided within the common space into sub-groups defined by a recursive k-means application, wherein:

the recursive k-means application defines a root item descriptor within said common mapping space. and defines map paths within said common mapping space that extend from the root item descriptor to end sub-groups located at the ends of the common mapping space, and traverse inner sub-groups in between;

said hierarchical tree structure is defined by the map paths from the root item descriptor to the end sub-groups, wherein said root item descriptor defines the root node of said hierarchical tree structure, the traversed inner sub-groups define inner nodes of said hierarchical tree, and the end sub-groups define leaf nodes of said hierarchical tree structure; and said sub-groups define said relations in the item descriptors.

9. The method of claim 8, wherein in step (a), said predefined biometric type is a blood vessel pattern from a predefined part of a human body, and said biometric training images are blood vessel training images.

10. The method of claim 8, further comprising after step (h):

(i) comparing said input biometric image to the registrable biometric image taken from the individual identified as said registered individual to determine if they match;

(ii) outputting a signal indicating that said registered individual matches said input biometric input image in response to a match being confirmed in step (i);

(iii) outputting a signal indicating that no registered individual was found in response to a match not being confirmed in step (i).

11. The method of claim 8, wherein step (g) further includes:

(i) identifying as a reference ID code, the registration ID code that is noted the second most often;

(ii) IF the number of times that the registration ID code corresponding to the target ID code is noted, is greater by a predefined threshold, than the number of times that the registration ID code corresponding to the reference ID code is noted, THEN proceeding to step (h), ELSE concluding that none of said collection of unique registrable biometric images is representative of said specific item and omitting step (h).

* * * * *